United States Patent [19]
Cole et al.

[11] Patent Number: 6,104,673
[45] Date of Patent: Aug. 15, 2000

[54] METHOD AND APPARATUS FOR TRANSMIT BEAMFORMER SYSTEM

[75] Inventors: Christopher R. Cole, Cupertino; Albert Gee, Los Altos; Thomas Liu, Stanford, all of Calif.

[73] Assignee: Acuson Corporation, Mountain View, Calif.

[*] Notice: This patent is subject to a terminal disclaimer.

[21] Appl. No.: 09/216,608

[22] Filed: Dec. 21, 1998

Related U.S. Application Data

[60] Continuation of application No. 08/891,174, Jul. 10, 1997, Pat. No. 5,856,955, which is a division of application No. 08/673,410, Jul. 15, 1996, Pat. No. 5,675,554, which is a continuation-in-part of application No. 08/286,652, Aug. 5, 1994, abandoned.

[51] Int. Cl.[7] .................................................. G03B 42/06
[52] U.S. Cl. .................................. 367/138; 367/7; 367/11
[58] Field of Search ................................ 367/138, 7, 11; 600/447; 73/626

[56] References Cited

U.S. PATENT DOCUMENTS

Re. 33,816  2/1992  Nagasaki et al. .
4,140,022   2/1979  Maslak .

(List continued on next page.)

FOREIGN PATENT DOCUMENTS 0 104 928 A2  4/1984  European Pat. Off. .
0 302554 A1   2/1989  European Pat. Off. .
WO 80/00497   3/1980  WIPO .
WO 83/02330   7/1983  WIPO .
WO 89/05122   6/1989  WIPO .
WO 98/20361   5/1998  WIPO .

OTHER PUBLICATIONS

Digital Preshaping of Ultrasonic Signals: Equipment and Applications; P.O. Borjesson, et al., 1982 Ultransonic Symposium, pp. 696–699.

The Influence of Front–End Hardware on Digital Ultrasonic Imaging: Mark E. Schafer, et al.; IEEE Transactions on Sonic and Ultrasonics, vol. SU–31, No. 4, Jul. 1984, pp. 295–306.

(List continued on next page.)

Primary Examiner—Daniel T. Pihulic
Attorney, Agent, or Firm—Brinks Hofer Gilson & Lione

[57] ABSTRACT

A digital transmit beamformer system with multiple beam transmit capability has a plurality of multi-channel transmitters, each channel with a source of sampled, complex-valued initial waveform information representative of the ultimate desired waveform to be applied to one or more corresponding transducer elements for each beam. Each multi-channel transmitter applies beamformation delays and apodization to each channel's respective initial waveform information digitally, digitally modulates the information by a carrier frequency, and interpolates the information to the DAC sample rate for conversion to an analog signal and application to the associated transducer element(s). The beamformer transmitters can be programmed per channel and per beam with carrier frequency, delay, apodization and calibration values. For pulsed wave operation, pulse waveform parameters can be specified to the beamformer transmitters on a per firing basis, without degrading the scan frame rate to non-useful diagnostic levels. Waveform parameters can be specified to the transmitters by an external central control system which is responsible for higher level flexibility, such as scan formats, focusing depths and fields of view. The transmit pulse delay specified per-channel to each transmitter is applied in at least two components: a focusing time delay component and a focusing phase component. The carrier frequency can be specified for each transmit beam, to any desired frequency within a substantially continuous predefined range of frequencies, and a beam-interleaved signal processing path permits operation in any of several predefined processing modes, which define different parameter sets in a trade-off among (1) the number of beams produced; (2) per-beam initial waveform sample interval; and (3) transmit frequency.

12 Claims, 9 Drawing Sheets

Microfiche Appendix Included
(195 Microfiche, 19058 Pages)

U.S. PATENT DOCUMENTS

| | | | |
|---|---|---|---|
| 4,155,258 | 5/1979 | Engeler et al. | 73/626 |
| 4,207,772 | 6/1980 | Stoller | 73/620 |
| 4,234,940 | 11/1980 | Iinuma | 367/105 |
| 4,456,982 | 6/1984 | Tournois | 367/11 |
| 4,470,308 | 9/1984 | Hayakawa et al. . | |
| 4,534,221 | 8/1985 | Fife et al. | 73/626 |
| 4,545,250 | 10/1985 | Miwa | 73/602 |
| 4,549,533 | 10/1985 | Cain et al. . | |
| 4,550,607 | 11/1985 | Maslak et al. | 73/626 |
| 4,699,009 | 10/1987 | Maslak et al. | 73/626 |
| 4,779,622 | 10/1988 | Nakamura et al. . | |
| 4,809,184 | 2/1989 | O'Donnell et al. . | |
| 4,815,043 | 3/1989 | Shirasaka | 367/7 |
| 4,839,652 | 6/1989 | O'Donnell et al. | 341/122 |
| 4,870,971 | 10/1989 | Russell et al. . | |
| 4,881,190 | 11/1989 | Priatko et al. | 364/718 |
| 4,886,069 | 12/1989 | O'Donnell . | |
| 4,893,284 | 1/1990 | Magrane | 367/12 |
| 4,896,287 | 1/1990 | O'Donnell et al. | 364/754 |
| 4,896,304 | 1/1990 | Tanigawa | 367/138 |
| 4,949,312 | 8/1990 | Iwasawa | 367/7 |
| 4,949,313 | 8/1990 | Iwasawa | 367/7 |
| 4,965,602 | 10/1990 | Kahrilas et al. | 342/372 |
| 4,975,885 | 12/1990 | Hassler et al. | 367/7 |
| 4,983,970 | 1/1991 | O'Donnell et al. | 341/122 |
| 5,005,419 | 4/1991 | O'Donnell et al. | 73/626 |
| 5,014,710 | 5/1991 | Maslak et al. . | |
| 5,014,712 | 5/1991 | O'Donnell et al. . | |
| 5,027,821 | 7/1991 | Hirama et al. . | |
| 5,047,769 | 9/1991 | Engeler et al. | 341/118 |
| 5,047,770 | 9/1991 | Engeler et al. | 341/120 |
| 5,105,814 | 4/1992 | Drukarev et al. . | |
| 5,111,695 | 5/1992 | Engeler et al. | 73/626 |
| 5,113,706 | 5/1992 | Pittaro | 73/626 |
| 5,121,364 | 6/1992 | O'Donnell | 367/98 |
| 5,123,415 | 6/1992 | Daigle . | |
| 5,142,649 | 8/1992 | O'Donnell | 367/7 |
| 5,165,413 | 11/1992 | Maslak et al. . | |
| 5,172,343 | 12/1992 | O'Donnell | 367/7 |
| 5,183,048 | 2/1993 | Eberle . | |
| 5,203,335 | 4/1993 | Noujaim et al. . | |
| 5,228,007 | 7/1993 | Murakami et al. | 367/103 |
| 5,230,340 | 7/1993 | Rhyne . | |
| 5,235,982 | 8/1993 | O'Donnell . | |
| 5,249,578 | 10/1993 | Karp et al. . | |
| 5,269,309 | 12/1993 | Fort et al. . | |
| 5,276,654 | 1/1994 | Mallart et al. | 367/7 |
| 5,301,674 | 4/1994 | Erikson et al. . | |
| 5,329,930 | 7/1994 | Thomas, III . | |
| 5,353,797 | 10/1994 | Matsushima et al. . | |
| 5,387,180 | 2/1995 | Lehmer . | |
| 5,431,053 | 7/1995 | Fink . | |
| 5,465,722 | 11/1995 | Fort et al. . | |
| 5,517,996 | 5/1996 | Okada et al. . | |
| 5,551,433 | 9/1996 | Wright et al. . | |
| 5,608,690 | 3/1997 | Hossack et al. | 367/138 |
| 5,617,862 | 4/1997 | Cole et al. . | |
| 5,675,554 | 10/1997 | Cole et al. | 367/7 |
| 5,696,737 | 12/1997 | Hossack et al. | 367/138 |
| 5,706,819 | 1/1998 | Hwang et al. . | |
| 5,724,976 | 3/1998 | Mine et al. . | |
| 5,856,955 | 1/1999 | Cole et al. | 367/138 |

OTHER PUBLICATIONS

Weighted Least–Squares Pulse–Shaping Filters with Application to Ultrasonic Signals; Bengt Mandersson, et al.; IEEE Transactions on Ultrasonics Ferroelectrics, and Frequency Control, vol. 36, No. 1; Jan. 1989; pp. 109–113.

Pulse–Echo Imaging Using a Nondiffracting Beam Transducer, J–Y. Lu et al.; pp. 265–281; 1991; Ultrasound in Medicine and Biology vol. 17, No. 3.

Experimental Verification of Nondiffracting X Waves, Jian–yu Lu, pp. 441–446, May 1992, IEEE Transactions on Ultrasonics, Ferroelectrics, and Frequency Control vol. 39, No. 3.

Formation and Propagation of Limited Diffraction Beams, Jian–yu Lu et al., pp. 331–343 1993, Acoustical Imaging vol. 20.

Modified X Waves with Improved Field Properties, Tai K. Song et al., pp. 36–47, 1993, Ultransonc Imaging vol. 15.

Producing Deep Depth of Field and Depth—Independent Resolution in NDE with Limited Diffraction Beams, Jian–yu Lu et al. pp. 134–149, 1993, Ultrasonic Imaging vol. 15.

In Vitro and In Vivo Real Time Imaging with Ultrasonic Limited Deffraction Beams, Jian–yu Lu, et al., pp. 819–829, Dec. 1993, IEEE Transactions On Medical Imaging vol. 12, No. 4.

Beamforming, Dan E. Dudgeon & Russell M. Mersereau, Multidimensional Digital Signal Processing, Section 6.2, Prentice Hall, 1984.

Digital Signal Processing for Sonar, William C. Knight, Roger G. Pridham, Streven M. Kay, Proceedings of the IEEE, vol. 69, No. 11, Nov. 1981.

Fundamentals of Digital Array Processing, Dan E. Dudgeon, Proceedings of the IEEE, vol. 65, No. 6, Jun. 1977.

The Development of an Ultrasound Diagnostic System with the Ability of Parallel Signal Receiving Using Digital Beam Formers, hirama, et al., Article 63V–1, Japan Medical Ultrasound Conference, No. 1993.

Test and Measurement Product Catalog, 1994 Tektronix.

Digital Beamforming Antennas; An Introduction, Hans Steyskal Microwave Journal, Jan. 1987.

Acuson 128 Computer Sonography Systems Service Manual, pp. 13–32, 113–125, Acuson Corp. Aug. 1989.

Digital Beamforming for Radar, P. Barton, Proceedings of the IEEE, vol. 127, pt. F, No. 4, Aug. 1980.

A Digital Synthetic Focus Acoustic Imaging System, P.D. Carl, G.S. Kino, C.S> Desilets, and P.M. Grant, Acoustic Imaging vol. 8, 1978.

Digital Beamforming in Ultrasound B.D. Steinberg, IEEE Transactions of Ultrasonic, Ferroelectronics, and Frequency Control, vol. 39, Nov. 1992.

A Novel Approach to Digital Beamforming, Roger Pridham and Ronald A. Mucci, Journal fo the Acoustical Society of America, vol. 63, Fed. 1978.

Digital Interpolation Beamforming for Low Pass and Band Pass Signals, Roger G. Pridham and Ronald A. Mucci, Procceedings of the IEEE, vol. 67, Jun. 1979.

Time–Domain Modeling of Pulsed Finite–Amplitude Sound Beams, Yang–sub Lee and Mark F. Hamilton, Acoustical Society of America, pp. 906–917, Feb. 1995.

Finite Amplitude Distortion–Based Inhomogeneous Pulse Echo Ultrasonic Imaging, Ted Christopher, IEEE Transactions of Ultrasonics, and Frequent Control, vol. 44, No. 1, Jan. 1997.

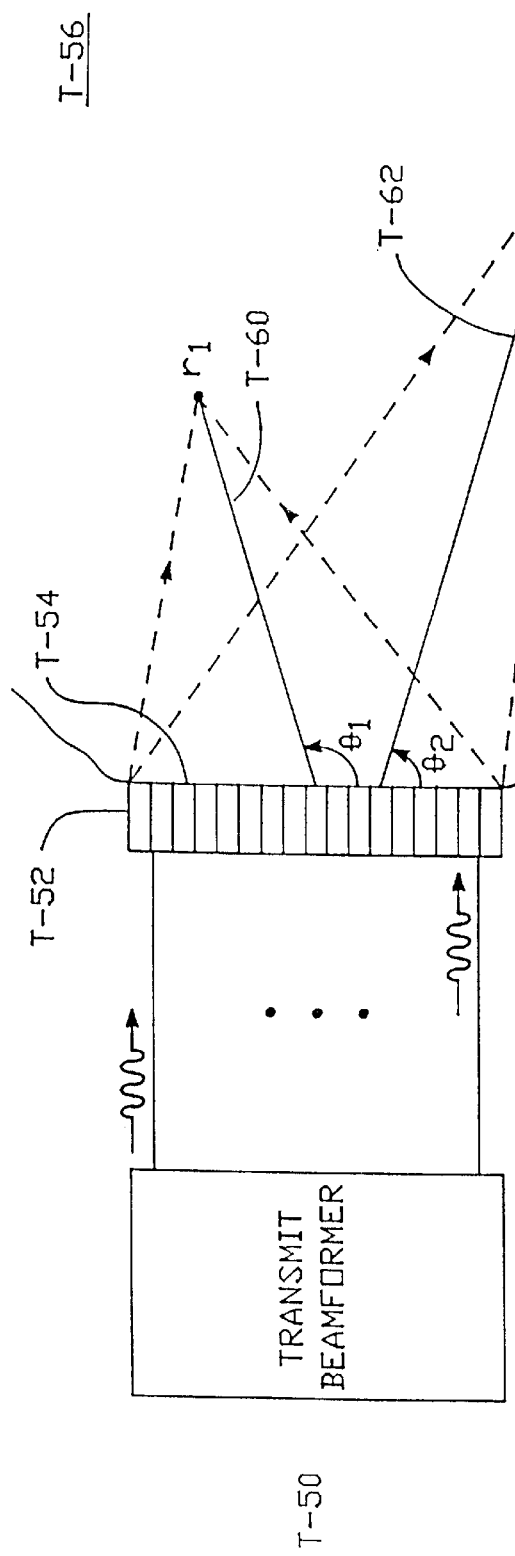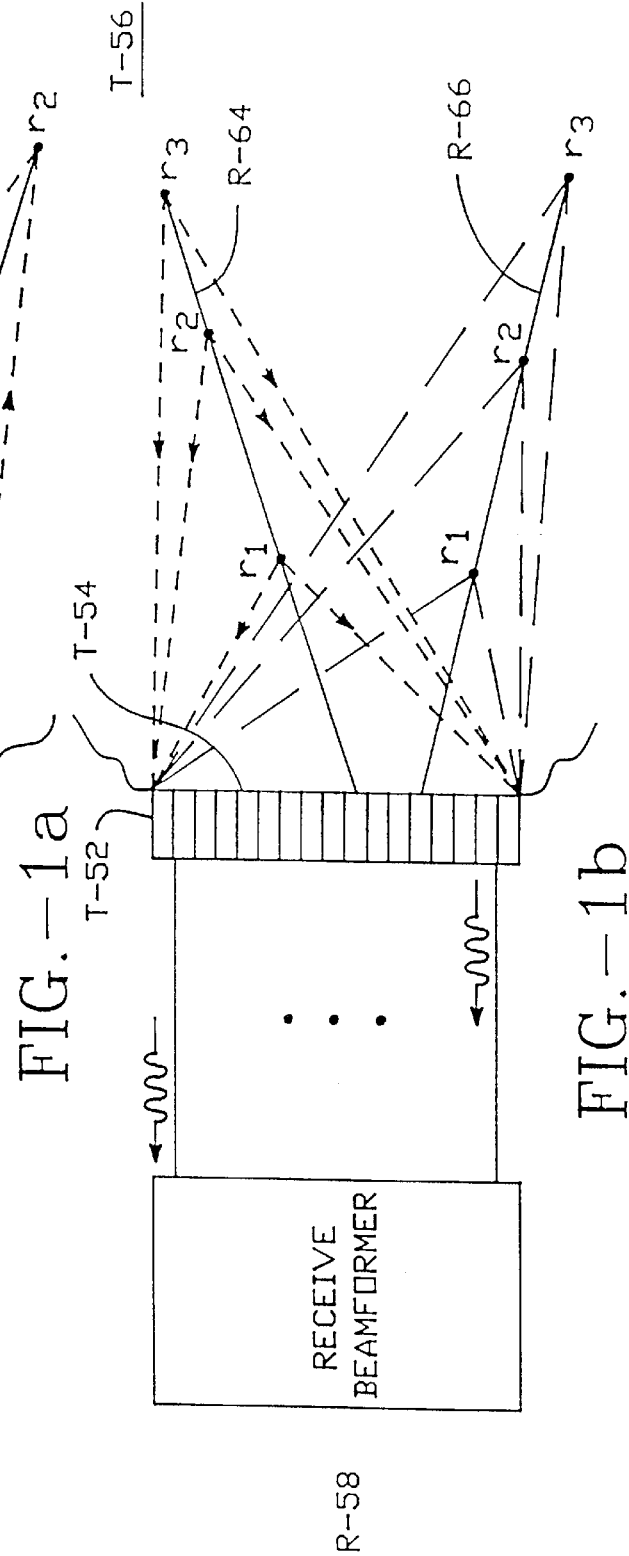

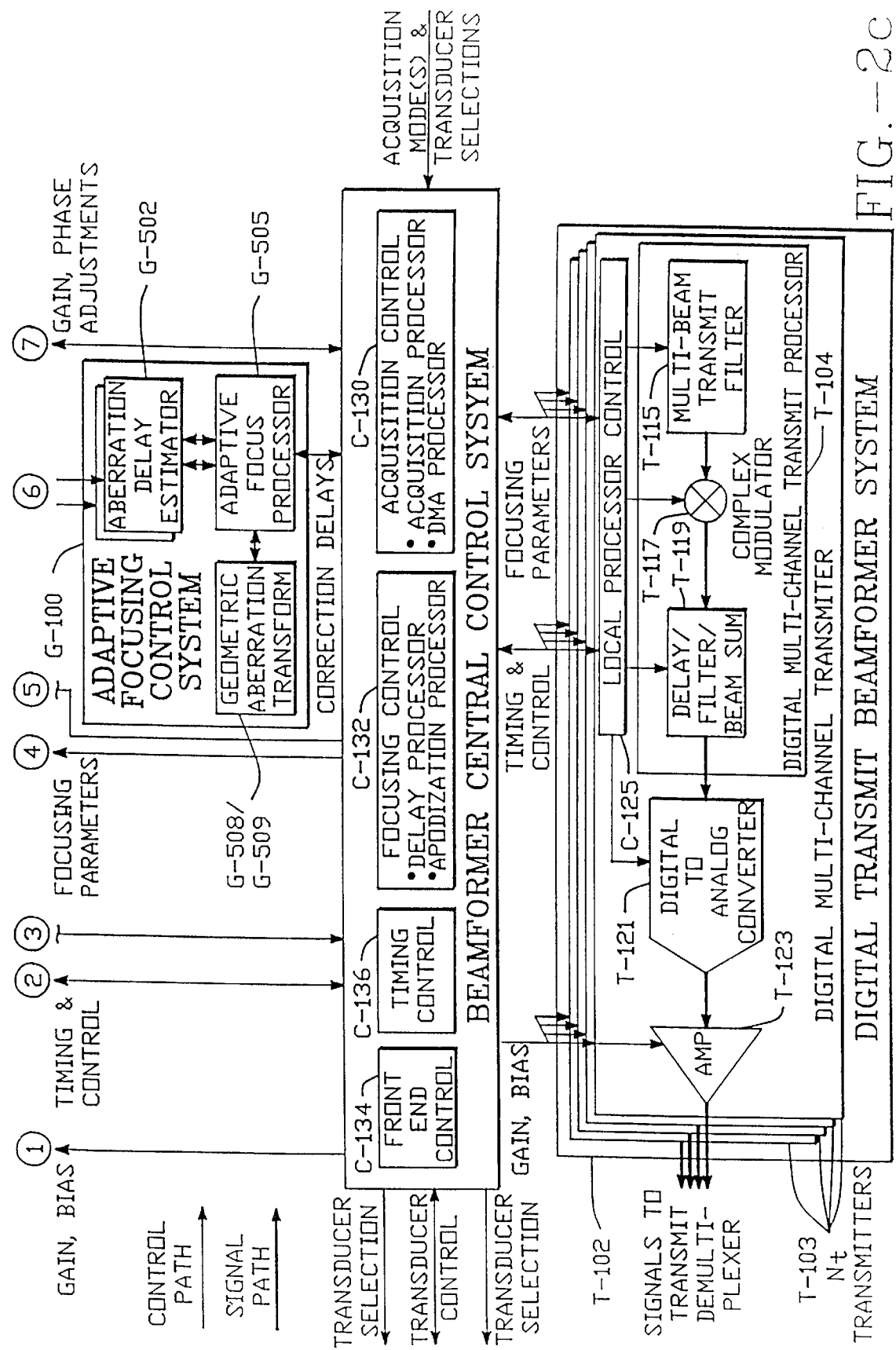

METHOD AND APPARATUS FOR TRANSMIT BEAMFORMER SYSTEM

REFERENCE TO RELATED APPLICATION

This application is a continuation of application Ser. No. 08/891,174, now U.S. Pat. No. 5,856,955, filed Jul. 10, 1997 which is a divisional of application Ser. No. 08/673,410, now U.S. Pat. No. 5,675,554, filed Jul. 15, 1996, which is a continuation in part of Ser. No. 08/286,652 filed Aug. 5, 1994, now abandoned.

CROSS-REFERENCE TO RELATED APPLICATIONS

This application is related to:

a. METHOD AND APPARATUS FOR RECEIVE BEAMFORMER SYSTEM, Wright et al.;

b. METHOD AND APPARATUS FOR FOCUS CONTROL OF TRANSMIT AND RECEIVE BEAMFORMER SYSTEMS, Gee et al.;

c. METHOD AND APPARATUS FOR DOPPLER RECEIVE BEAMFORMER SYSTEM, Maslak et al.;

d. METHOD AND APPARATUS FOR ADJUSTABLE FREQUENCY SCANNING IN ULTRASOUND IMAGING, Wright et al.;

e. METHOD AND APPARATUS FOR A BASEBAND PROCESSOR OF A RECEIVE BEAMFORMER SYSTEM, Wright et al.;

f. METHOD AND APPARATUS FOR BEAMFORMER SYSTEM WITH VARIABLE APERTURE, Cole et al.

The above patent applications are all commonly assigned with the present application, filed concurrently with the present application, and are all incorporated herein by reference in their entirety.

The present application is also related to the following previously filed applications:

a. METHOD AND APPARATUS FOR REAL-TIME, CONCURRENT ADAPTIVE FOCUSING IN AN ULTRASOUND BEAMFORMER IMAGING SYSTEM, Wright et al., Ser. No. 08/286,528, filed Aug. 5, 1994;

b. METHOD AND APPARATUS FOR A GEOMETRIC ABERRATION TRANSFORM IN AN ADAPTIVE FOCUSING ULTRASOUND BEAMFORMER SYSTEM, Wright et al., Ser. No. 08/286,664, filed Aug. 5, 1994;

c. METHOD AND APPARATUS FOR COHERENT IMAGE FORMATION, Wright et al., Ser. No. 08/286,510, filed Aug. 5, 1994.

REFERENCE TO MICROFICHE APPENDIX

This application includes a microfiche appendix of 195 sheets of microfiche having 19,058 frames. A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

I. FIELD OF THE INVENTION

This invention relates to coherent imaging systems including, for example, radar, sonar, seismic, and ultrasound systems, using vibratory energy, and in particular, but not limited to, phased array ultrasound imaging systems for scan formats such as linear, steered linear, sector, circular, Vector®, steered Vector® and other types of scan formats in imaging modes such as, by way of example only, B-mode (gray-scale imaging mode), F-mode (flow or color Doppler imaging mode), M-mode (motion mode) and D-mode (spectral Doppler mode). Although the invention will be discussed with respect to an ultrasound system, the invention can be implemented with other types of coherent imaging systems.

II. BACKGROUND OF THE INVENTION

A. Literature

The open literature, which presents issues relevant to imaging systems in general, includes the following documents which are incorporated herein by reference:

1. Dan E. Dudgeon, "Fundamentals of Digital Array Processing," *Proceedings of the IEEE,* volume 65, pp. 998–904, Jun. 1977.
2. Dan E. Dudgeon and Russell M. Mersereau, *Multidimensional Digital Signal Processing,* Chapter 6, Section 2: "Beamforming," Prentice Hall, 1984.
3. William C. Knight, Roger G. Pridham, and Steven M. Kay, "Digital Signal Processing for Sonar," *Proceedings of the IEEE,* volume 69, pages 1451–1506, November 1981. (Digital beamformers for use in sonar described on pages 1465–1471.)
4. Roger G. Pridham and Ronald A. Mucci, "A Novel Approach to Digital Beamforming," *Journal of the Acoustical Society of America,* volume 63, pages 425–434, February 1978.
5. Roger G. Pridham and Ronald A. Mucci, "Digital Interpolation Beamforming for Low-Pass and Bandpass Signals," *Proceedings of the IEEE,* volume 67, pages 904–919, June 1979.
6. P. Barton, "Digital Beamforming for Radar," *IEE Proceedings,* volume 127, part F, number 4, August 1980.
7. P. D. Carl, C. S. Kino, C. S. Desilets and P. M. Grant, "A Digital Synthetic Focus Acoustic Imaging System," *Acoustic Imaging,* volume 8, pp. 39–53, 1978.
8. B. D. Steinberg, "Digital Beamforming in Ultrasound," *IEEE Transactions on Ultrasonics, Ferroelectrics, and Frequency Control,* volume 39, pp. 716–721, November 1992.
9. Hans Steyskal, "Digital Beamforming Antennas," *Microwave Journal,* volume 30, No. 1, pp. 107–124, January 1987.
10. R. E. Crochiere and L. R. Rabiner, "Multirate Digital Signal Processing," Chapter 2, Prentice Hall, 1983.

B. Analog and Hybrid (Analog-Digital) Beamformer Systems

Relevant analog and hybrid (analog-digital) phased array beamformer system art can be found in the following patents which are incorporated herein by reference:

| U.S. Pat. No.: | Title: | Inventor(s): |
| --- | --- | --- |
| 4,140,022 | MULTIPLE TRANSDUCER ACOUSTIC IMAGING APPARATUS | Samuel H. Maslak |
| 4,550,607 | PHASED ARRAY ACOUSTIC IMAGING SYSTEM | Samuel H. Maslak J. Nelson Wright |
| 4,699,009 | DYNAMICALLY FOCUSED LINEAR | Samuel H. Maslak Hugh G. Larsen |

C. Digital Receive Beamformer Systems

The concept of a digital receive beamformer system has been proposed in the art with respect to ultrasound systems. By way of example, the following U.S. patents, all of which are incorporated herein by reference, discuss various aspects of such systems. The parents include:

| U.S. Pat. No.: | Title: | Inventor(s): |
|---|---|---|
| 4,809,184 | METHOD AND APPARATUS FOR FULLY DIGITAL BEAM FORMATION IN A PHASED ARRAY COHERENT IMAGING SYSTEM | Matthew O'Donnell<br>Mark Magrane |
| 4,839,652 | METHOD AND APPARATUS FOR HIGH SPEED DIGITAL PHASED ARRAY COHERENT IMAGING SYSTEM | Matthew O'Donnell<br>William E. Engeler<br>Thomas L. Vogelsong<br>Steven G. Karr<br>Sharbel E. Noujaim |
| 4,886,069 | METHOD OF, AND APPARATUS FOR, OBTAINING A PLURALITY OF DIFFERENT RETURN ENERGY IMAGING BEAMS RESPONSIVE TO A SINGLE EXCITATION EVENT | Matthew O'Donnell |
| 4,893,284 | CALIBRATION OF PHASED ARRAY ULTRASOUND PROBE | Mark G. Magrane |
| 4,896,287 | CORDIC COMPLEX MULTIPLIER | Matthew O'Donnell<br>William E. Engeler |
| 4,975,885 | DIGITAL INPUT STAGE FOR AN ULTRASOUND APPARATUS | Dietrich Hassler<br>Erhard Schmidt<br>Peter Wegener |
| 4,983,970 | METHOD AND APPARATUS FOR DIGITAL PHASED ARRAY IMAGING | Matthew O'Donnell<br>William E. Engeler<br>John J. Bloomer<br>John T. Pedicone |
| 5,005,419 | METHOD AND APPARATUS FOR COHERENT IMAGING SYSTEM | Matthew O'Donnell<br>Kenneth B. Welles, II<br>Carl R. Crawford<br>Norbert J. Plec<br>Steven G. Karr |
| 5,014,710 and 5,165,413 | PHASED ARRAY ACOUSTIC IMAGING SYSTEM STEERED LINEAR COLOR DOPPLER IMAGING | Samuel H. Maslak<br>Donald J. Burch<br>J. Nelson Wright<br>Hugh G. Larson<br>Donald R. Langdon<br>Joel S. Chaffin<br>Grant Flash, III |
| 5,111,695 | DYNAMIC PHASE FOCUS FOR COHERENT IMAGING BEAM FORMATION | William E. Engeler<br>Matthew O'Donnell<br>John T. Pedicone<br>John J. Bloomer |
| 5,142,649 | ULTRASONIC IMAGING SYSTEM WITH MULTIPLE, DYNAMICALLY FOCUSED TRANSMIT BEAMS | Matthew O'Donnell |
| 5,230,340 | ULTRASOUND IMAGING SYSTEM WITH IMPROVED DYNAMIC FOCUSING | Theador L. Rhyne |
| 5,235,982 | DYNAMIC TRANSMIT FOCUSING OF A STEERED ULTRASONIC BEAM | Matthew O'Donnell |
| 5,249,578 | ULTRASOUND IMAGING SYSTEM USING FINITE IMPULSE RESPONSE DIGITAL CLUTTER FILTER WITH FORWARD AND REVERSE COEFFICIENTS | Sidney M. Karp<br>Raymond A. Beaudin |

The basic feature of a digital receive beamformer system as disclosed above can include: (1) amplification of the ultrasound signal received at each element of an array such as, for example, a linear array; (2) direct per channel analog-to-digital conversion of the ultrasound signal with an analog-to-digital sampling rate at least twice the highest frequency in the signal; (3) a digital memory to provide delays for focusing; and (4) digital summation of the focused signals from all the channels. Other processing features of a receive beamformer system can include phase rotation of a receive signal on a channel-by-channel basis to provide fine focusing, amplitude scaling (apodization) to control the beam sidelobes, and digital filtering to control the bandwidth of the signal.

D. Transmit Beamforming

The above literature points out the ever-present desire to achieve more accurate focusing, better resolution, better sensitivities and higher frame rates in ultrasonic images. In order to do so, versatile adjustments of the beamforming characteristics are required in order to optimize the results for a given scan requirement. The greatest versatility is obtained when the ultrasound instrument can entirely change the number of beams transmitted simultaneously, the pulse waveform (PW) or continuous waveform (CW) characteristics, time delays and apodization values on a per-scan-line basis. However, such versatility can undesirably require extensive hardware resources if carried out in a direct implementation.

The above literature reveals extensive effort in the improvement of images through the use primarily of improved receive beamformers. Receive beamformers which employ digital techniques and digital signal processing have been reported in the prior art, though substantial improvements are still possible through innovative designs. Little effort, however, has been made to improve the characteristics of transmit beam formation. In the past, transmit beams were typically gated carrier pulses generated at a desired carrier frequency by analog circuitry. The only flexibility which was available to optimize the transmit pulse waveform shape (envelope) was typically an ability to specify the length of the pulse in terms of an integer number of carrier cycles it should contain, and some fixed analog filtering. Apodization and delay profiles for beamforming would be specified, and typically implemented in an analog fashion as well, with inherent precision limitations. The envelope shape of a pulse waveform was otherwise essentially fixed, and due to the limitations of analog processing, was not optimal. Also, whereas prior transmit beamformers were able to support different apodization profiles and different delay profiles for each firing in a scan, and were able to support different pulse lengths for each firing, the carrier frequency could not be changed between scan lines, nor could other characteristics of the envelope shape, other than its length, be modified.

There are significant advantages to be obtained by enhancing the flexibility of a transmit beamformer using digital processing techniques. For example, it would be desirable to be able to arbitrarily and independently shape the waveform which is to be applied to each of the ultrasonic transducer elements, in order to compensate for imperfections in the response of the transducer element or in the analog path to the transducer element. As another example, it would be desirable to change the waveform carrier frequency applied to each transducer element on a per-scan-line basis in order to mitigate the effects of grating lobes. See, for example, the above-cited METHOD AND APPARATUS FOR ADJUSTABLE FREQUENCY SCANNING IN ULTRASOUND IMAGING co-pending patent application. As yet another example, it would be desirable to improve focal precision in a transmit beam, such as by eliminating the tendency of analog components to drift over time or to correct for aberrating tissue (see, for example, the above-cited METHOD AND APPARATUS FOR REAL TIME, CONCURRENT ADAPTIVE FOCUSING IN AN ULTRASOUND BEAMFORMER IMAGING SYSTEM co-pending patent application). As still another example, it would be desirable to transmit pulses with special modulations, such as chirp or pseudo-random coded waveforms, in order to produce temporally longer pulses while maintaining range resolution in the resulting image. As yet another example, it would be desirable to be able to support multi-beam transmissions on a single firing as a way to increase the frame rate, to reduce speckle effects, or to achieve compound focusing (multiple focal points). As another example, it would be desirable to be able to transmit pulses having a precisely defined shape which will compensate for the distorting effects of attenuative body tissue. As yet another example, it would be desirable to update as many of the characteristics of a transmit pulse on a per-scan-line basis as possible. Simultaneous satisfaction of all these objectives cannot be obtained using presently available ultrasonic transmit beamformers.

Single channel digital programmable waveform generators are known in the field of test instruments for their ability to precisely generate arbitrary waveforms. See, for example, Priatko U.S. Pat. No. 4,881,190, and Tektronix, "Test and Measurement Product Catalog 1994", pp. 337–359, both incorporated herein by reference. The techniques used in these test instruments are generally not applicable or practical for phased array ultrasonic transmit beamforming, however, and in any event, have not been used for that purpose. For example, they could support only a single transmit channel and could not perform beamforming, in part because of cost, power and space constraints.

As used herein, an "?analog" signal is a signal whose value at any given moment in time can take on any value within a continuous range of values. Analog signals can also be continuous in time, or sampled in time. A "digital" signal, as the term is used herein, can take on only discrete values at discrete time intervals. Also as used herein, the term "ultrasonic" refers to any frequency which is above the range of human hearing. Also as used herein, a device or function which is "programmable" includes those which can be programmed either by providing specific values for use by the device or function, or by selecting such values from a predetermined set of available values.

III. SUMMERY OF THE INVENTION

One way to achieve ultimate flexibility in ultrasonic digital transmit beamforming would be to write a digital representation of the entire waveform sample sequence for each transducer element, and each firing, to a memory. The waveform representations would be precomputed and stored to account for modulation, envelope shaping, and beamformation apodization and delays. A firing (transmit event) would then be effected by reading out of the memory the waveforms associated with all transducer elements simultaneously and applying them to digital-to-analog converters (DACs) associated with each respective transducer element, at the sample rate assumed by the waveform representation. Scanning would be effected by sequencing through the different waveform sets associated with each firing in the scan. Such a system would be a direct implementation of a digital transmit beamformer.

While such a system could be built and could achieve the desired objectives, it is impractical with current technology for several reasons. First, a large amount of memory would be required, and it would have to operate at very high data rates. Second, assuming an aspect of the desired flexibility includes the flexibility to alter the waveforms in real time prior to each firing, then the amount of computations required to compute each waveform, and the amount of time required to download all of the waveform samples into the memory, would reduce the scan frame rate to levels which are not diagnostically useful.

Preferably, therefore, roughly described, the present method and apparatus of the invention provides for a substantially digital signal processing architecture of independent transmitters, preferably each assigned to one or more transducers, which are fully programmable for adjustment of signal parameters and beamformation parameters at rates consistent with multiple range focusing and with updating at every scan line. Each transmitter has multiple processing channels that can support formation of multiple simultaneous beams (scan lines). The independence, programmability, and processor channelization support a versatility not available in prior art. The architecture achieves independent transmitters (1) by creating a separate central control apparatus (subject of co-pending patent application METHOD AND APPARATUS FOR FOCUS CONTROL OF TRANSMIT AND RECEIVE BEAMFORMER SYSTEMS) that determines all signal and beamformation parameters independent of all transmitters, and (2) by programming the parameters into each transmitter at rates needed to sustain multiple range focusing and scan-line-to-scan-line adjustments. The digital transmit beamformer architecture can therefore support conventional beamformation, and can also support enhanced transmit beamformer capability, such as adaptive focus beamformation. Signal and beamformation parameters that can be programmed on a scan-line interval basis include: delay sample values, apodization sample values, modulation frequency, signal-defining and signal-shaping filter values, gain, sample rate, gain and phase calibration adjustments, and number of simultaneous transmit beams. An advantage of a system architecture with independent transmitters having programmable features is the ability to support new transmit beamformation techniques, which can be accomplished by reprogramming the types of parameters sent to the transmitters.

The digital transmit beamformer system has a plurality of transmit processors each with a source of real- or complex-valued initial waveform samples of the ultimate desired waveform to be applied to one or more corresponding transducer elements. Preferably, for pulse wave (PW) transmissions, the waveform samples are a baseband (at or near 0 Hz) representation of the desired transmit pulse. In that case the waveform samples represent the real or complex envelope of the transmit pulse. The source of initial waveform samples might be a memory, for example, and it might be shared among two or more transmit processors. For continuous wave (CW) transmissions, each transmit processor provides a continual sequence of unit waveform samples. Each transmit processor applies beamformation delays and apodization to its respective initial waveform samples digitally, and digitally modulates the information to a carrier frequency. It also interpolates the information to the DAC sample frequency for conversion to an analog signal and application to the associated transducer element(s). Each transmit processor can process one to four transmit channels.

The digital transmit beamformer has a high degree of programmability. In particular, pulse shape can be programmed by assignment of appropriate initial waveform samples to each transmit processor; carrier frequency is also a programmable parameter, as are per-transmit-channel delay and apodization values. Arbitrary delay correction values, additional to the above delay values and computed by external equipment to adjust for aberration and calibration effects, can also be programmed for each transmit channel.

Because of the above parameterization of transmit waveforms, extensive flexibility is achieved without incurring the problems associated with the direct implementation approach described above. Additionally, the amount of information which must be specified to each transmitter in order to produce a desired composite beam response by firing the ultrasonic transducer array is substantially reduced compared to that of the direct implementation approach. Thus, for PW operation, pulse waveform parameters can be specified to the transmit beamformer on a per transmit channel and per firing basis, without degrading the scan frame rate to non-useful diagnostic levels. Waveform parameters can be specified to the transmitters by an external central control system (see above-cited METHOD AND APPARATUS FOR FOCUS CONTROL OF TRANSMIT AND RECEIVE BEAMFORMER SYSTEMS co-pending patent application) which is responsible for higher level flexibility, such as scan formats, focusing depths and fields of view; thus the parameterization permits each transmitter to concern itself with only the generation of a single output pulse waveform.

In another aspect of the invention, the transmit pulse delay which is specified for each transmit channel is applied in at least two components: a coarse delay which is an integer number of sample intervals and a focusing phase adjustment equivalent to a delay which represents a fractional sample interval. A "coarse delay" is applied by time-delaying the memory read-out of initial waveform samples for the transmit channel by an integer number of samples of the memory read-out sample interval. Such time delays achieve a level of time coherence to within a single sample interval at the focal point(s) among the pulse waveforms produced by the different transmitters. Phase coherence is then achieved by phase rotation of each complex sample in a transmit channel by a carrier phase-angle-equivalent delay derived from the sample fraction portion of the transmit time delay specified to the transmitter as an integer-fraction value normalized to the sample interval. Additionally, if upsampling to the DAC sample frequency is accomplished in two stages instead of one, then more precise time coherence can be achieved. Specifically, an intermediate portion (referred to herein as the "fine delay") of the transmit time delay which was specified to the transmit channel may be applied by additionally delaying the signal by an integer number of sample times at the intermediate sample rate. Note that as used herein, a delay can be either positive or negative, a negative delay being the same as a positive advance.

Each transmitter applies its specified apodization to the transmitter's initial waveform samples rather than to the ultimate transmit waveform samples applied to the DAC, thereby permitting the apodization multiplier to operate at the initial waveform sample rate rather than at the much higher sample rate of the ultimate transmit waveform sample sequence. Similarly, complex phase rotation is performed preferably at the initial waveform sample rate rather than at the DAC sample rate.

The eventual transmit carrier frequency $F_c$ out of the DAC can be specified to the transmit signal path, to any desired frequency within a substantially continuous predefined range of frequencies. The desired frequency $F_c$ is defined by selecting one of a predefined plurality of available nominal center frequencies $F_0$, and specifying a vernier factor $v=F_c/F_0$. Each choice of $F_0$ chooses a different set of digital filters in the signal path, optimized for the selected nominal center frequency $F_0$. The value v can be specified to any value within a range of 0 to 2 and with a precision as fine as the number of bits with which it is specified, although in practice the specification may be limited to a smaller predefined range. The available $F_0$ frequencies are preferably spaced closely enough such that, together with the vernier factors, the transmitter can produce any carrier frequency within a large range of frequencies, with a precision limited only by the number of bits with which v is specified. The transmitter preferably modulates the initial waveform samples by $F_c$ by first applying a phase ramp, its slope determined by v, to each sample, and then modulating the signal by $F_0$ using digital processing means. Application of the phase ramp is performed by phase rotation of each real- or complex-valued sample by the phase ramp value for that sample, again, preferably at the initial waveform sample rate.

In order to produce multiple beams, multiple waveforms (one associated with each beam) are produced simultaneously in each transmitter. The multiple waveforms, after application of appropriate delay and apodization, are superposed in the transmitter before being applied to the transducer element related to the transmitter. Waveform parameters for the different beams can be shared or specified separately for each waveform to be produced by a transmitter, including the initial waveform samples.

When producing multiple transmit beams, each transmitter preferably processes its multiple waveforms in an interleaved manner using shared processing resources to a point in the signal path at which they are summed to generate the composite waveform that will generate multiple beams when combined with the composite waveforms produced by the other transmitters. Prior to that point in the signal path, the transmitter is operable in any of several predefined processing modes. The available processing resources preferably define processing modes with different parameter sets in a computational efficiency trade-off among (1) the maximum number of beams; (2) the initial waveform sampling rate (related to the maximum transmit bandwidth); and (3) transmit frequency (more precisely, the nominal center frequency $F_0$). The trade-offs provided by the available processing modes permit maximum usage of the available computational capacity of the hardware.

IV. BRIEF DESCRIPTION OF THE DRAWINGS

The invention will be described with respect to particular embodiments thereof, and reference will be made to the drawings, in which:

FIGS. 1a and 1b conceptually depict the transmission and reception of ultrasound beams to and from body tissue;

FIG. 2a depicts a high level block diagram schematic of a novel ultrasound beamformer system of an ultrasound medical imaging system including an embodiment of a digital transmit beamformer system of the invention;

FIGS. 2b and 2c taken together depict a detailed block diagram of the ultrasound beamformer system of FIG. 2a;

Figure 4:
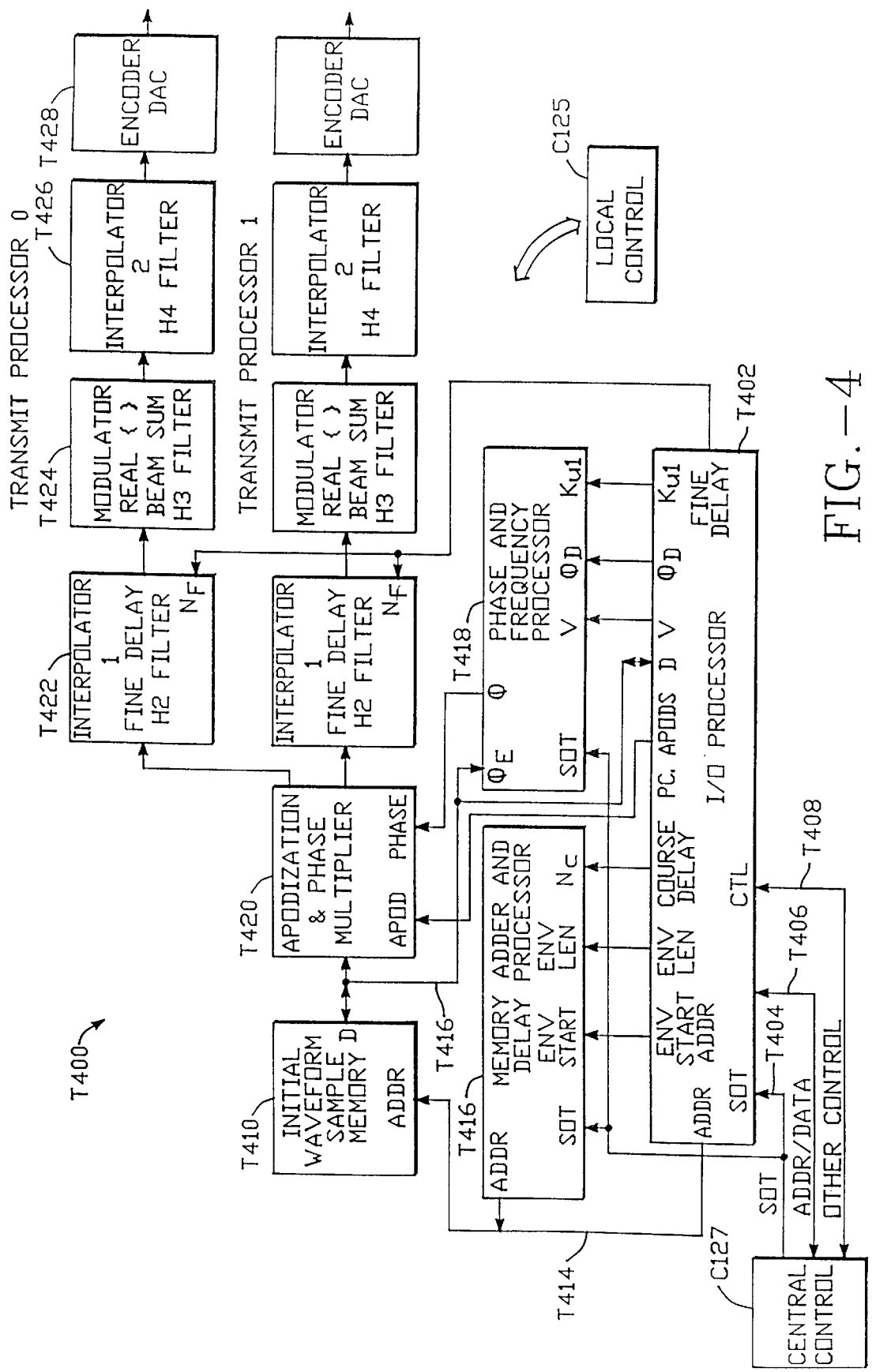
FIG. 4 is a block diagram of an implementation of apparatus which implements two transmit processors of the transmit beamformer of FIG. 2C.
Figure 6:
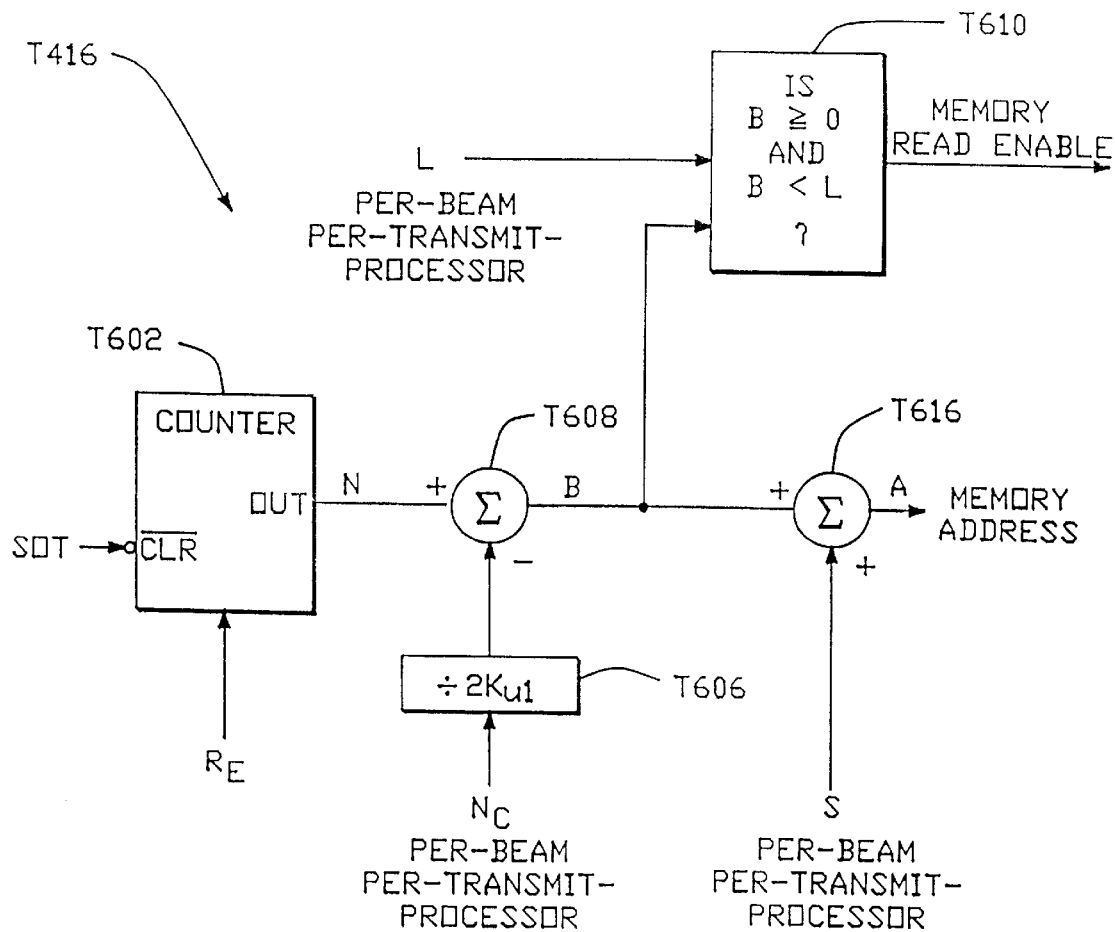
Figure 7:
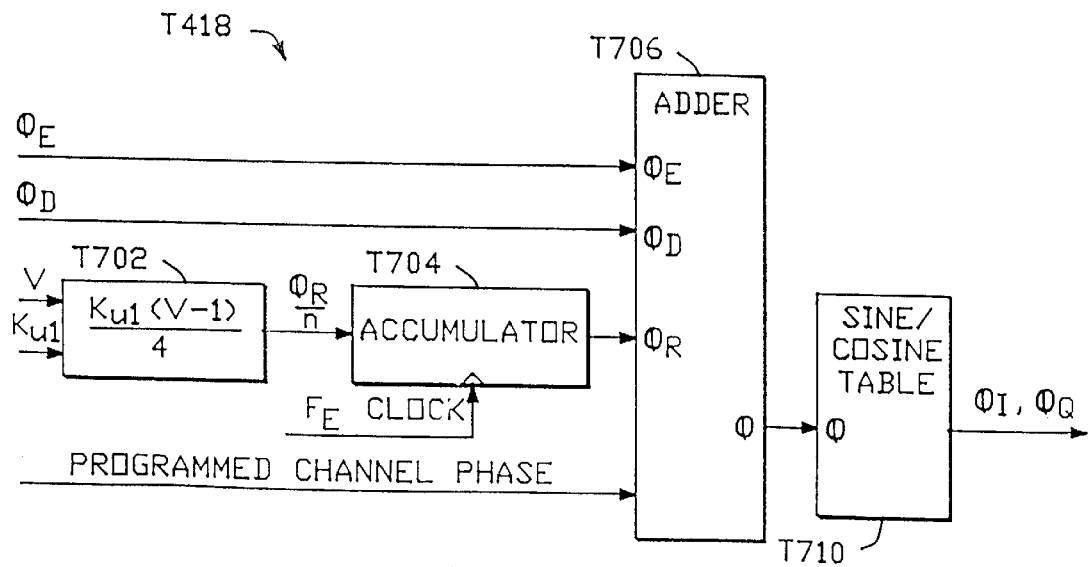
Figure 8:
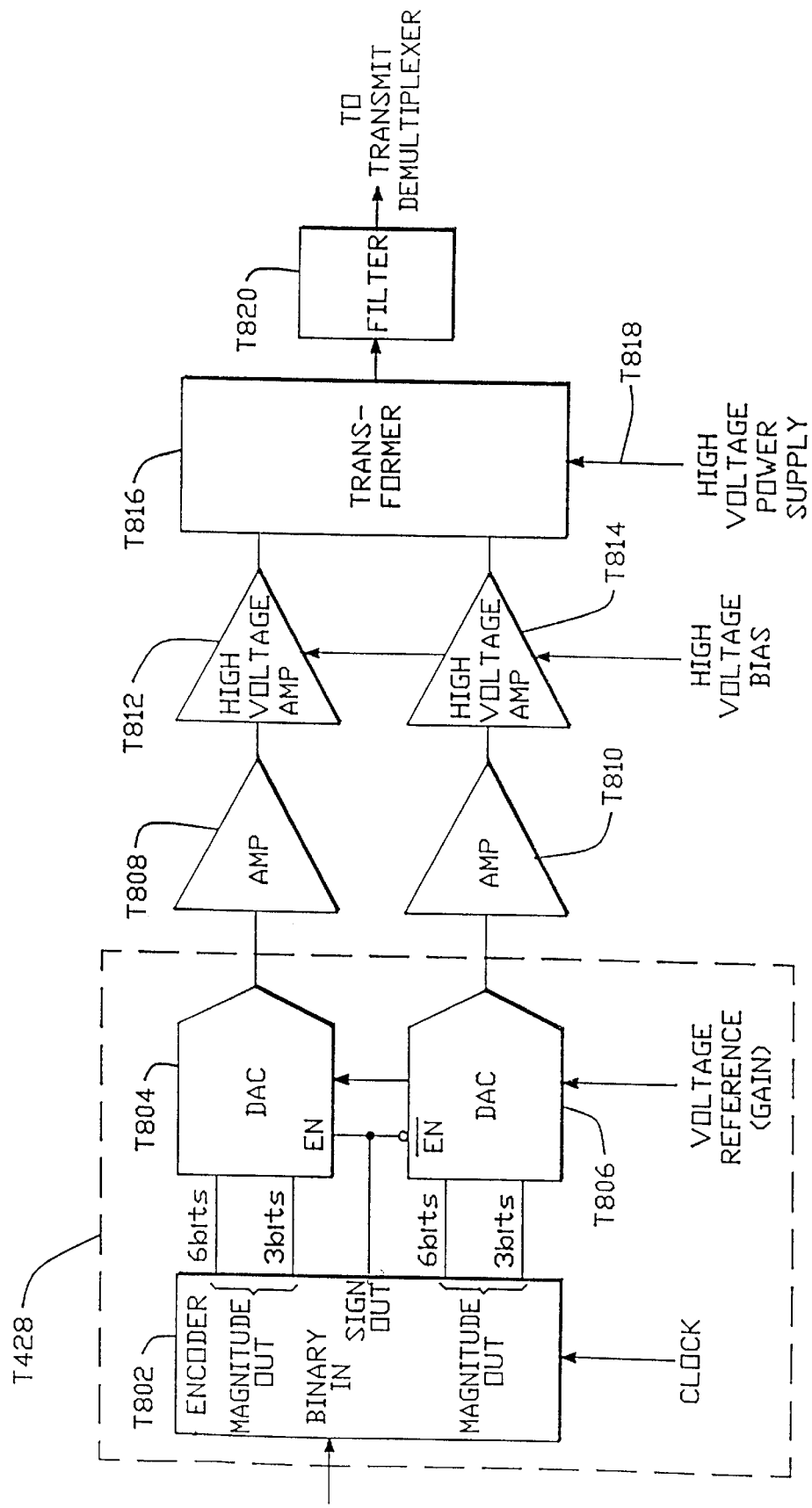

FIG. 6 functionally illustrates computations made by the memory address and delay processor of FIG. 4;

FIG. 7 functionally illustrates the calculations performed by the phase processor of FIG. 4; and FIG. 8 functionally illustrates the encoder/DAC of FIG. 4.

V. DETAILED DESCRIPTION OF THE PREFERRED EMBODIMENT

The present invention represents a component of a medical ultrasound imaging system for which additional patent applications, listed above, have been simultaneously filed in the United States Patent and Trademark Office.

A. Overview of Preferred Beamformer System Architecture

1. Ultrasound Signal Description

With respect to the present invention, ultrasound imaging is accomplished by firing (transmitting) into body tissue or other objects to be imaged a scan sequence of focused ultrasonic beams centered along straight lines in space called transmit scan lines (FIG. 1a). The transmit scan lines are generated by a transmit beamformer and an ultrasound transducer array. The transmit scan lines are spaced to produce a planar linear, planar sector or other display of the tissue via a pre-defined firing or scanning pattern. Focused to some defined depth in the tissue, the ultrasonic transmit continuous-wave (CW) or pulse-wave (PW) signal, propagating at an assumed constant propagation velocity of nominally c=1540 m/sec through the tissue, interacts with the tissue and reflects a small portion of the signal back to the ultrasound transducer array that initiated the ultrasound signal. The round trip delay time is shortest for those targets closest to the ultrasound transducer array, and longest for those targets farthest from the transducer array. With the application of appropriate time delays, the receive beamformer (FIG. 1b) can dynamically focus receive beams along straight lines in space called receive scan lines commencing, for example, with the shallowest range (depth) of interest and evolving toward the deepest range of interest.

FIGS. 1a and 1b depict representations of transmit and receive scan lines (solid) and straight-line signal propagation paths from individual elements (dashed), respectively. In FIG. 1a, the transmit beamformer is generally identified by T-50 with the transducer array T-52 containing a multiplicity of individual transducer elements T-54 organized as a linear phased array in this particular embodiment. As is known in the art, there are a great variety of transducer array configurations available for use with ultrasound transmit and receive beamformer systems. As can be seen in FIG. 1a, the transmit beamformer T-50 sends appropriately time-delayed electrical signals to the individual transducer elements T-54. These transducer elements T-54 then in turn convert electrical signals into acoustic waves that propagate into the body tissue T-56. By applying different time delays to the excitation signals sent to the individual transducer elements T-54, transmit scan lines T-60 and T-62, having respective foci $r_1$ and $r_2$, can be established. It is to be understood that each of these transmit scan lines is representative of a center line of a different transmit beam which is steered and focused into the body to be imaged.

The transmit beamformer T-50 can generate simultaneous multiple beams along different scan lines, or different focal depths along the same scan line (compound focus). Further, the multiple transmit beams can each scan the entire image format or be transmitted such that each of the multiple beams only scans a specified section of the image format.

FIG. 1b depicts a digital receive beamformer R-58 which is also connected to the transducer array T-52. Also depicted in FIG. 1b are receive scan lines R-64, R-56 corresponding to a dynamically focused first receive beam and a dynamically focused second receive beam, respectively. The beams are sampled in range at a plurality of focal depths ($r_1$, $r_2$, $r_3$) along each scan line. In the digital receive signal path of the present invention, transducer array signals can be selectively separated into data representative of multiple individual beams.

Each scan line of a transmit or receive scan pattern can be parameterized by the origin on the transducer array, the scan line orientation (angle $\theta$) and the focus depth or range (r). The ultrasound imaging system of the present invention stores a pre-computed sparse data set of focusing time delay and aperture apodization values indexed by these parameters (based on geometric considerations as is known in the art) and expands the values by real-time computational means to control the transmit and receive beamformation systems that produce the desired scan lines.

2. Beamformer System

Figure 2A:
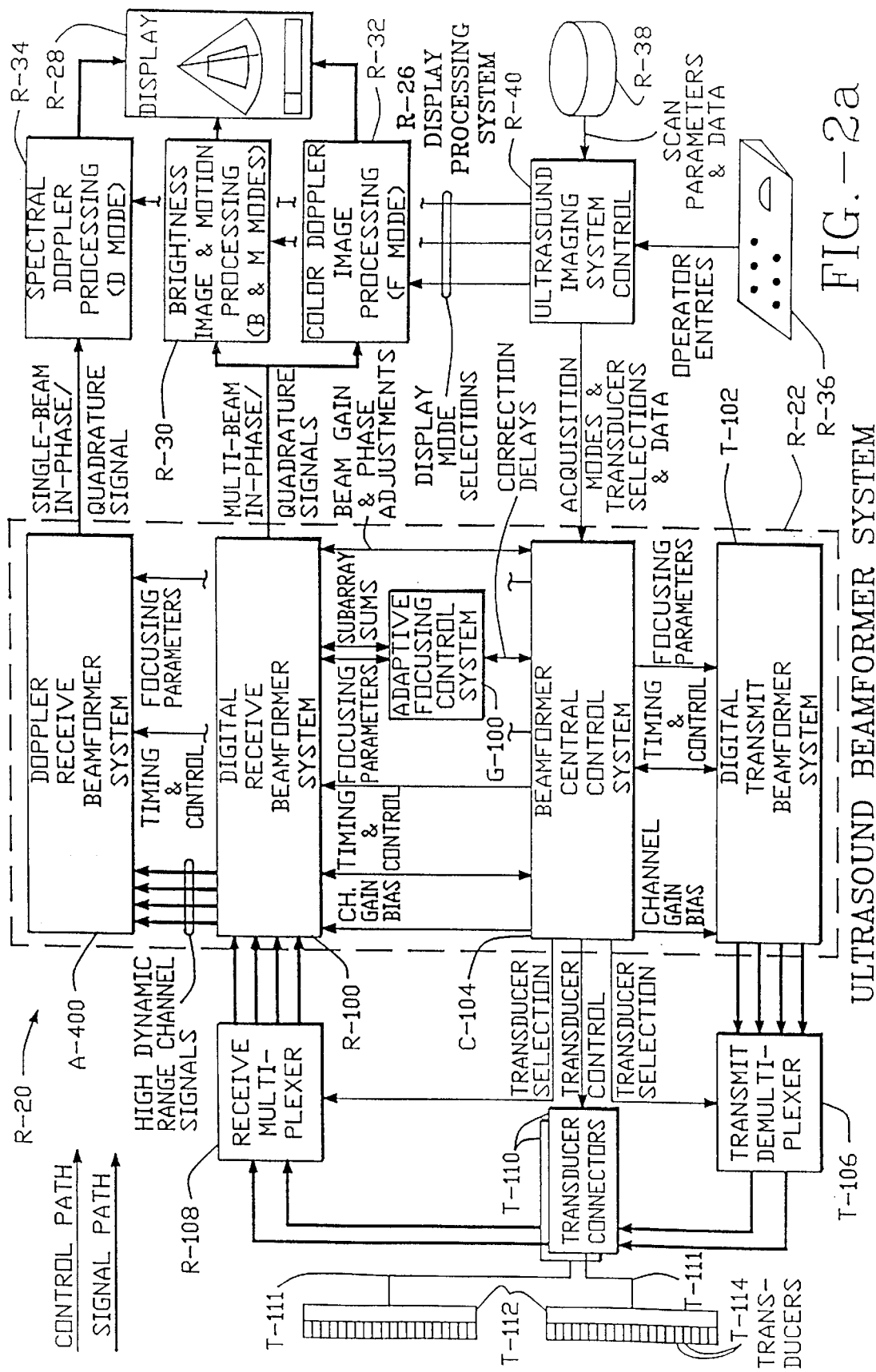
Figure 2B:
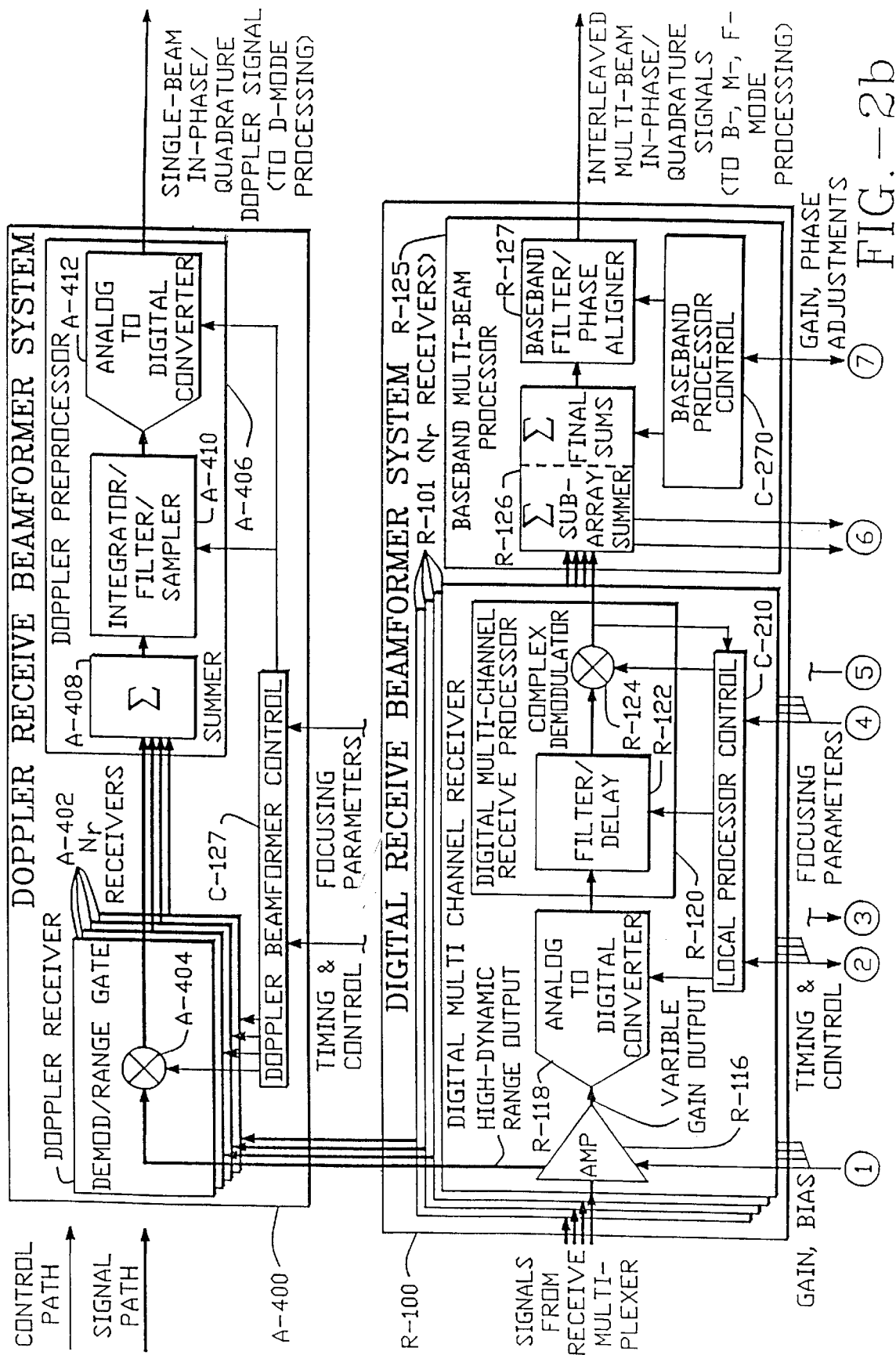

FIGS. 2a, 2b, 2c depict an overall block diagram of a medical ultrasound imaging system R-20. Ultrasound system R-20 includes a beamformer system R-22, one or more transducers T-112, a display processing system R-26 with a display R-28 and an ultrasound imaging system control R-40.

In FIGS. 2a, 2b, or 2c, the beamformer system R-22 includes inventive and novel (1) digital transmit beamformer system T-102, (2) digital receive beamformer system R-100, (3) beamformer central control system C-104, (4) adaptive focusing control system G-100, (5) Doppler receive beamformer system A-400, (6) baseband multi-beam processor R-125, and (7) coherent sample synthesizer S-100. These systems are depicted as high level, functional block diagrams. The blocks are abstracted from the actual implementation of a preferred embodiment in order to better illustrate the signal processing functions performed.

As indicated in FIG. 2a, beamformer system R-22 provides two sources of digital beam data to the display processing system R-26: (1) Doppler receive beamformer single-beam complex in-phase/quadrature data representing coherent temporal sampling of the beam (CW case) or coherent temporal sampling at one range location along the beam (PW case), and (2) digital receive beamformer multi-beam complex in-phase/quadrature data representing coherent sampling in range along each receive scan line. Beamformer system R-22 can be operated to provide a sequence of scan lines and associated samples as above to provide data for a variety of display modes. By way of example, possible display modes and their associated processors include (1)

brightness image and motion processor R-30 for B-mode (gray-scale imaging) and M-mode (motion display), (2) color Doppler image processor R-32 for flow imaging, and (3) spectral Doppler processor R-34 for wide dynamic nonimaging Doppler velocity vs. time displays. Additional display modes can be created from the two complex data sources of R-22, as will be obvious to those skilled in the art.

Ultrasound system R-20 also includes a transmit demultiplexer T-106 for routing the output waveforms from the transmitters T-103 to the transducer elements T-114, a receive multiplexer R-108 for routing the input waveforms from the transducer elements T-114 to the receivers R-101, one or more transducer connectors T-110 and transducer arrays T-112. Many types of transducer arrays can be used with the present system.

Ultrasound system R-20 also includes an ultrasound imaging system control R-40, archival memory R-38 for storing scan parameters and scan data, and operator interface R-36.

As used herein, the term ultrasonic refers to frequencies above the range of human hearing. However, the transducer arrays T-112 are optimized for frequencies typically within the range of 2–10 MHz.

The transducer array T-112 is interchangeable with a variety of different kinds of transducer arrays, including but not limited to linear, curved, curvi-linear and annular transducer arrays. A variety of transducer array shapes and frequencies are desirable in order to satisfy the requirements of a variety of different clinical settings. However, the transducer arrays T-112 are typically optimized for frequencies within the above specified range of 2–10 MHz. The medical ultrasound system R-20 performs the three major functions of driving the ultrasonic transducer array of elements T-114 to transmit focused ultrasound energy, receiving and focusing back-scattered ultrasound energy impinging on the transducer array T-114, and controlling the transmit and receive functions to scan a field of view in scan formats including (but not limited to) linear, sector or Vector® format.

In FIGS. 2a, 2b, 2c, the control signals are communicated over the light lead lines while the signal paths are depicted with heavy lead lines.

3. Digital Transmit Beamformer System

The digital transmit beamformer T-102 (FIG. 2c) is the subject of this application. It is to be understood that in a preferred embodiment, the digital transmit beamformer T-102 is comprised of a plurality of digital multi-channel transmitters T-103, one digital multi-channel transmitters for one or more of the individual transducer elements T-114. The transmitters are multi-channel in that each transmitter can process, in a preferred embodiment, up to four independent beams. Thus, for example, 128 multi-channel transmitters have 512 channels. In other preferred embodiments, more than four independent beams can be achieved. Processing more than four beams per processor is within the scope of the invention.

In a preferred embodiment, each of the digital multi-channel transmitters T-103 produces as its output in response to an excitation event the superposition of up to four pulses, each pulse corresponding to a beam. Each pulse has a precisely programmed waveform, whose amplitude is apodized appropriately relative to the other transmitters and/or channels, and delayed by a precisely defined time delay relative to a common start-of-transmit (SOT) signal. Transmitters T-103 are also capable of producing CW.

Each digital multi-channel transmitter T-103 conceptually comprises a multiple beam transmit filter T-115 which provides an output to a complex modulator T-117. The output from complex modulator T-117 is communicated to a delay/filter block T-119, and therefrom is provided to a digital-to-analog converter (DAC) T-121. The output of the DAC T-121 is amplified by an amplifier T-123. The multiple beam transmit filter T-115, the complex modulator T-117 and the delay/filter block T-119 comprise a digital multi-channel transmit processor T-104.

The transmit filter T-115 can be programmed to provide any arbitrary real or complex waveform responsive to a start-of-transmit (SOT) signal. The transmit filter T-115 is implemented with a memory which stores real or complex samples of any desired and arbitrary pulse waveform, and a means of reading the samples out sequentially in response to the start-of-transmit (SOT) signal delayed by a component of the focusing delay. In a preferred embodiment, the memory of T-115 is programmed to store baseband representations of real or complex pulse envelopes.

Block T-115, although primarily a memory, is referred to herein as a transmit filter, as the output of block T-115 can be thought of as the time response of a filter to an impulse. The complex modulator T-117 upconverts the envelope to the transmit frequency and provides appropriate focusing phase and aperture apodization.

Delay/filter block T-119 conceptually provides any remaining focusing delay component and a final shaping filter. The digital-to-analog converter (DAC) T-121 converts the transmit waveform samples to an analog signal. The transmit amplifier T-123 sets the transmit power level and generates the high-voltage signal which is routed by the transmit demultiplexer T-106 to a selected transducer element T-114.

Associated with each multi-channel transmit processor T-104 is a local or secondary processor control C-125 which provides control values and parameters, such as apodization and delay values, to the functional blocks of multi-channel transmit processor T-104. Each local or secondary channel control C-125 is in turn controlled by the central or primary control system C-104.

4. Digital Receive Beamformer System

The digital receive beamformer R-100 (FIG. 2b) is the subject of the above cited co-pending application entitled: METHOD AND APPARATUS FOR RECEIVE BEAMFORMER SYSTEM.

The signals from the individual transducer elements T-114 represent return echoes or return signals which are reflected from the object being imaged. These signals are communicated through the transducer connectors T-110 to the receive multiplexer R-108. Through multiplexer R-108, each transducer element T-114 is connected separately to one of the plurality of digital multi-channel receivers R-101 which taken together with summer R-126 comprise the digital receive beamformer R-100 of the invention. The receivers are multi-channel in that each receiver can process, in a preferred embodiment, up to four independent beams. Processing more than four beams per processor is within the scope of the invention.

Each digital multi-channel receiver R-101 can, in a preferred embodiment, comprise the following elements which are represented by the high level function block diagram in FIG. 2b. These elements include a dynamic low-noise and variable time-gain amplifier R-116, an analog-to-digital converter (ADC) R-118, and a digital multi-channel receive processor R-120. The digital multi-channel receive processor R-120 conceptually includes a filter/delay unit R-122 and a complex demodulator R-124. The filter/delay unit R-122 provides for filtering and coarse focusing time delay. The complex demodulator R-124 provides for fine focusing delay in the form of a phase rotation and apodization (scaling or weighting), as well as signal demodulation to or near baseband. The digital multi-channel receivers R-101 communicate with summer R-126 where the signal samples associated with each beam from each receive processor are summed to form final receive scan line samples, and the resulting complex samples provided to baseband processor R-125. The exact functioning and composition of each of these blocks will be more fully described hereinbelow with respect to the remaining figures.

A local or secondary control C-210 is associated with each digital multi-channel receiver R-101. Local processor control C-210 is controlled by central or primary control C-104 and provides timing, control and parameter values to each said receiver R-101. The parameter values include focusing time delay profiles and apodization profiles.

5. Doppler Receive Beamformer System

The Doppler receive beamformer system A-400 for wide dynamic range, nonimaging Doppler acquisition includes analog receivers A-402, each of which receives echo signals from a respective one or more transducers T-114. Each of the Doppler receivers A-402 includes a demodulator/range gate A-404 which demodulates the received signal and gates it (PW mode only) to select the echo from a narrow range. The analog outputs of the Doppler receivers A-402 are communicated to a Doppler preprocessor A-406. In preprocessor A-406, —he analog signals are summed by summer A-408 and then integrated, filtered, and sampled by analog processor A-410. Preprocessor A-406 then digitizes the sampled analog signal in an analog-to-digital converter (ADC) A-412. The digitized signal is communicated to the display processing system R-26. The Doppler receive beamformer system is the subject of the above identified co-pending patent application entitled: METHOD AND APPARATUS FOR DOPPLER RECEIVE BEAMFORMER SYSTEM which has been incorporated herein by reference.

Associated with all Doppler receivers A-402 is a single local or secondary Doppler beamformer control C-127. Doppler beamformer control C-127 is controlled by central or primary control system C-104 and provides control and focusing parameter values to the Doppler receive beamformer system A-400.

As pointed out in the above patent application describing the Doppler receive beamformer system A-400, the present beamformer system R-22 advantageously combines an imaging digital receive beamformation system R-100 and a nonimaging Doppler receive beamformation system A-400 in a manner which uses the same digital transmit beamformation system T-102 and the same transducer array and allows the digital receive beamformation system R-100 to be optimized for imaging modes such as B-mode and color Doppler imaging, and therefore has high spatial resolution, while the accompanying Doppler receive beamformation system has a wide dynamic range and is optimized for use in acquiring signals for nonimaging Doppler processing.

6. Beamformer Central Control System

The beamformer central control system C-104 of the present invention controls the operation of the digital transmit beamformer system T-102, the digital receive beamformer system R-100, the Doppler receive beamformer system A-400, the adaptive focusing control system G-100, and the baseband processor R-127. The beamformer control is more fully discussed in the above referenced and incorporated patent application entitled: METHOD AND APPARATUS FOR FOCUS CONTROL OF TRANSMIT AND RECEIVE BEAMFORMER SYSTEMS.

The main control functions of the central control system C-104 are depicted in FIG. 2c. The control functions are implemented with four components. The acquisition control C-130 communicates with the rest of the system including the ultrasound system control R-40 and provides high level control and downloading of scanning parameters. The focusing control C-132 computes in real time the dynamic delay and apodization digital values required for transmit and receive beamformation, which includes pre-computed and expanded ideal values plus any estimated correction values provided by adaptive focusing control system G-100. The front end control C-134 sets the switches for the demultiplexer T-106 and the multiplexer R-102, interfaces with the transducer connectors T-110, and sets the gain and bias levels of all transmitter amplifiers T-123 and all receive amplifiers R-116. The timing control C-136 provides all the digital clocks required by the digital circuits. This includes the sampling clocks for all the transmitter DACs T-121 and receiver ADCs R-118.

In a preferred embodiment central control C-104 expands sparse tables of focusing time delay and aperture apodization values based on pre-computed and stored data, through such techniques as interpolation and extrapolation. The expanded delay and apodization values are communicated as a profile of values across the transducer aperture to the local processor controls, where the delay and apodization data expansion in range is completed to per-transducer-element, per-sample, per-beam values.

7. Adaptive Focusing Control System

Adaptive focusing control system G-100 provides for real time concurrent adaptive focusing. Adaptive focusing control system G-100 is comprised of an adaptive focus processor G-505 which provides focus correction delay values to the focus control C-122 of the central control C-104. Adaptive focus processor G-505 operates on output produced by aberration value estimators G-502 from data gathered from the subarray summers R-126 of the digital receive beamformer system R-100. Accordingly, aberration correction values, preferably aberration delay and amplitude values, are adaptively measured for each receive scan line or for a subset of receive scan lines in range regions corresponding to transmit focal depths by the adaptive focusing control subsystem G-100 shown in FIG. 2c. Adaptive focusing control system G-100 is more fully described in the above identified co-pending patent application entitled: METHOD AND APPARATUS FOR REAL TIME, CONCURRENT ADAPTIVE FOCUSING IN AN ULTRASOUND BEAMFORMER IMAGING SYSTEM.

It is to be understood that in addition to the adaptive focusing control system which adjusts focus delays, that a number of adaptive control systems are contemplated. These systems, by way of example, include (1) adaptive contrast enhancement control system for adjusting focus delays and aperture apodizations, (2) adaptive interference cancellation control for adjusting focus delays and phases, aperture apodizations, and (3) adaptive target enhancement control for adjusting focus delays and phase, aperture apodizations, imaging transmit and receive frequencies and baseband waveform shaping.

Another aspect of adaptive focusing which can be included in the preferred embodiment of the adaptive focusing control system G-100 is a geometric aberration transform device G-508/509 which can provide aberration correction delay values to the adaptive focus processor G-505 for scan lines and scan line depth locations for which measured aberration values were not collected by aberration value estimators G-502. More specifically, measured aberration correction values are written to a delay table in G-508/509. G-508/509 retrieves values from the delay table according to look-up rules of the geometric aberration transform to form focusing delay correction profiles across the aperture valid for depths, scan geometries, and acquisition modes other than the depth, scan geometry, and mode for which aberration correction values were measured. The geometric aberration transform device G-508/509 is the subject of the above identified co-pending U.S. patent application entitled: METHOD AND APPARATUS FOR A GEOMETRIC ABERRATION TRANSFORM IN AN ADAPTIVE FOCUSING ULTRASOUND BEAMFORMER SYSTEM.

8. Baseband Processor System

The baseband processor R-125 provides for filtering, and receive-scan-line-to-receive-scan-line (beam-to-beam) amplitude and phase adjustments as discussed herein and in the above-referenced and incorporated patent applications entitled: METHOD AND APPARATUS FOR BASEBAND PROCESSOR FOR A RECEIVE BEAMFORMER SYSTEM and METHOD AND APPARATUS FOR ADJUSTABLE FREQUENCY SCANNING IN ULTRASOUND IMAGING, and the above-referenced patent application entitled METHOD AND APPARATUS FOR COHERENT IMAGE FORMATION.

The baseband processor R-125 additionally includes a baseband filter, a complex multiplier, and a baseband processor control which controls the operation of the baseband filter and complex multiplier. The baseband processor control is controlled by central control C-104.

9. Coherent Sample Synthesizer System

The coherent sample synthesizer system S-100 (FIG. 2a) is the subject of the above-identified application entitled: METHOD AND APPARATUS FOR COHERENT IMAGE FORMATION.

This system exploits the multi-beam transmit and multi-beam receive capability of the invention to acquire and store coherent (pre-detection) samples of receive beam data along actual scan lines and to perform interpolation of the stored coherent samples to synthesize new coherent samples at new range locations along existing scan lines or along synthetically-created scan lines. Both acquired and synthesized samples are passed to the display processing system R-26.

10. Transmit and Receive Multiplexers

The connectivity between the transducer array elements T-114 and the processors T-103, R-101, A-402 of the digital transmit, digital receive, and Doppler receive beamformer systems is established through a transmit demultiplexer T-106 and a separate receive multiplexer R-108, as shown in FIG. 2a. The multiple-transducer multiplexer configuration shown in FIG. 2a permits selection of transmit and receive apertures lying entirely within a single transducer array or straddling across two transducer arrays. The two multiplexers are independently controlled by the beamformer central control system C-104 and may be programmed to support a number of acquisition modes, including sliding aperture and synthetic aperture modes. The multiplexers and their connectivity are the subject of the above-cited co-pending application entitled: METHOD AND APPARATUS FOR BEAMFORMER SYSTEM WITH VARIABLE APERTURE.

B. Digital Transmit Beamformer System Preferred Embodiment

1. Digital Multichannel Transmit Processor Digital Signal Processing

In the preferred embodiment, the transmit beamformer T102 includes a substantially independent waveform generating processor for each transmit element. Transmit processors T104 are referred to herein as multichannel processors because each of the individual transmit processors can provide multiple, programmable complex envelope waveform generation. A substantially continuous range of imaging frequencies is supported.

Overall, each transmit processor performs the primary functions of (1) waveform shaping of one or more waveforms for one or more beams, (2) apodization, and (3) insertion of steering/focusing time delays for such waveforms. To perform waveform shaping for a PW transmission, the signal path begins with initial waveform samples at a rate $R_E$ below that of the DAC T121 sampling frequency $F_S$. The initial waveform samples can have a frequency spectrum centered at 0 Hz, or can be offset from 0 Hz. Waveform shaping in the present embodiment involves the steps of upsampling the initial waveform samples to $F_S$, as well as modulating the waveforms by the desired carrier frequency $F_c$. Amplitude weighing (apodization) can also be considered part of the waveform shaping operation. The steps of upsampling, modulating, apodizing and delaying, as well as appropriate filtering, can be performed in any sequence in a digital transmit beamformer, and individual ones of these steps may even be divided into sub-steps which are separated and performed at different parts of the signal path. Additionally, some steps or sub-steps may be combined for implementation in a single hardware unit.

Note that the output carrier frequency is considered herein to be substantially the same as the desired programmed carrier frequency $F_c$, but may not be identical because of filter effects in the signal path. $F_c$ is set by the central control system C104 through the download of parameters.

a. Transmit Processing Modes

Before describing the functional blocks in a digital multichannel transmit processor of the preferred embodiment, it will be useful to understand the various processing modes (not to be confused with imaging modes discussed above) in which each transmit processor can operate. Ideally, it would be desirable for each transmit processor to be able to produce waveforms for any number of superposed and separately delayed and apodized transmit beams up to some maximum, at any carrier frequency up to some maximum, specified with initial waveform representations sampled at any sample rate up to some maximum. This would require extensive processing power, however, especially if the maximums are large. Since processing power is limited in any system, it would seem that these maximums must be kept low enough such that the hardware is able to keep up when all three parameters are specified at maximum. The present embodiment, on the other hand, makes better use of the available processing capacity by permitting trade-offs among these three parameters and allowing the central control system to choose to optimize different ones of them depending on the clinical setting.

Table I sets forth some of the processing modes which can be selected by central control system C107 for a given transmit processor T104 of transmit beamformer T102. Different embodiments can support fewer or greater numbers of modes and fewer or greater numbers of beams. As used in the Table:

$F_S$ is the system clock frequency at which samples are converted by the DACs T121 (FIG. 1B). The central control system C104 can select $F_S$ from a variety of available frequencies.

$F_0$ is a transmit signal nominal center frequency. $F_0$ is specified to the multichannel transmitter as a fraction of $F_S$, and is equal to (or near) the carrier frequency.

$R_E$ is the per-beam initial waveform sampling rate. The ratio $R_E/F_0$ represents the number of real or complex samples per period of the transmit signal nominal center frequency $F_0$, at which the initial waveform can be sampled.

$\lambda_0 = c/F_0$ = the acoustic wavelength at $F_0$.

C = the speed of sound in the body.

$\gamma_E$ = per-beam initial waveform sample interval = $c/2R_E$.

$N_B$ = maximum number of simultaneously-produced beams for the given transmit processing mode. (Note that the beamformer can be operated to produce fewer than $N_B$ beams if desired; for example, in a mode for which $N_B = 4$, the beamformer can be operated to produce only three beams if desired, although this would not make full use of the available hardware processing power.)

N/I = Mode not implemented in the embodiment described herein.

TABLE I

TRANSMIT PROCESSING MODES

| $F_0$ | $N_B = 1$ | $N_B = 2$ | $N_B = 4$ |
|---|---|---|---|
| $F_S/32$ | BW Mode 0<br>$R_E = 8F_O$<br>$\gamma_E = \lambda_O/16$ | BW Mode 1<br>$R_E = 4F_O$<br>$\gamma_E = \lambda_O/8$ | BW Mode 2<br>$R_E = 2F_O$<br>$\gamma_E = \lambda_O/4$ |
| $F_S/16$ | BW Mode 1<br>$R_E = 4F_O$<br>$\gamma_E = \lambda_O/8$ | BW Mode 2<br>$R_E = 2F_O$<br>$\gamma_E = \lambda_O/4$ | BW Mode 3<br>$R_E = F_O$<br>$\gamma_E = \lambda_O/2$ |
| $F_S/8$ | BW Mode 2<br>$R_E = 2F_O$<br>$\gamma_E = \lambda_O/4$ | BW Mode 3<br>$R_E = F_O$<br>$\gamma_E = \lambda_O/2$ | BW Mode 4<br>$R_E = F_O/2$<br>$\gamma_E = \lambda_O$ |
| $F_S/4$ | BW Mode 3<br>$R_E = F_O$<br>$\gamma_E = \lambda_O/2$ | BW Mode 4<br>$R_E = F_O/2$<br>$\gamma_E = \lambda_O$ | N/I |
| $F_S/8$ | BW Mode 5<br>$R_E = 2F_O/3$<br>$\gamma_E = 3\lambda_O/4$ | BW Mode 6<br>$R_E = F_O/3$<br>$\gamma_E = 3\lambda_O/2$ | N/I |

As can be seen by reading horizontally across the Table, for each transmit signal nominal center frequency $F_0$, the hardware permits a larger number $N_B$ of superposed waveforms to be traded off against an increased per-beam initial waveform sample interval $\gamma_E$, and vice-versa. A larger $N_B$ translates into a higher frame rate (since the entire field of view can be scanned with the same number of beams but fewer firings), while an enhanced initial waveform sample interval $\gamma_E$ (smaller value of $\gamma_E$) can translate into a sharper image in range. For example, therefore, in a display mode which displays a color flow Doppler (F-mode) image superimposed on a grey-scale (B-mode) image, produced by interleaving F-mode and B-mode pulse firings respectively, the central control system C104 may operate transmitters T102 at $N_B = 1$ for all B-mode imaging pulses and at $N_B = 2$, or $N_B = 4$, for color flow Doppler imaging pulses.

Similarly, reading vertically down the Table and excluding bandwidth modes 5 and 6, it can be seen that for a given maximum number of beams $N_B$, processing modes having a higher nominal center frequency $F_0$ also have a larger (and therefore poorer) per-beam initial waveform sample interval $\gamma_E$ (relative to $\lambda_0$). (The per-beam initial waveform sample interval $\gamma_E$, when expressed as the ratio $\gamma_E/\lambda_0$ is referred to herein as the frequency-normalized per-beam initial waveform sample interval.) A clinician typically selects a transducer array operable at the imaging frequency appropriate for a desired penetration. In doing so, the clinician trades off penetration for overall image resolution (ability to distinguish two targets). (The latter trade-off is inherent in the physics of ultrasound since greater penetration is achieved by reducing the imaging frequency, which in turn reduces the overall image resolution.) For a given maximum number of beams $N_B$, the desired penetration determines $F_0$ in the Table, which in turn determines a processing mode having the optimum frequency-normalized per-beam initial waveform sample interval which the hardware can provide at the selected $F_0$. That is, as $F_0$ decreases to achieve greater penetration, the signal processing path in each transmit processor T104 need not process as many samples per second per beam (at least at early stages of the signal processing pipeline). This leaves hardware processing capacity available, which the system can exploit by increasing $R_E/F_0$ and hence improving the frequency-normalized per-beam initial waveform sample interval $\gamma_E/\lambda_0$.

Further, by reading diagonally across the Table (upward to the right), and again excluding modes 5 and 6, it can be seen that the hardware permits a lower $F_0$ to be traded off for a larger number of beams $N_B$ at a constant frequency-normalized per-beam initial waveform sample interval $\gamma_E/\lambda_0$.

Described more generally, the modes with which the multichannel transmitter T102 can be specified to operate actually offer trade-offs between three parameters: $N_B$, $F_0$ and $\gamma_E/\lambda_0$ (or equivalently, $R_E/F_0$). Thus each processing mode defines a parameter set $\{N_B, F_0, \gamma_E/\lambda_0\}$. All of the processing modes shown in Table I satisfy the rule that, for a given $F_S$, the product of the maximum number of beams $N_B$ and the transmit signal nominal center frequency, divided by the frequency normalized per-beam initial waveform sample interval, is constant. In addition, the following relationships hold:

$$\gamma_E = 2 \cdot c \cdot N_B / F_S$$

and $$R_E = F_S / 4 N_B.$$

Assuming each transmitter T102 is operated to produce the maximum number of beams $N_B$ in the selected processing mode, all of the modes in Table I fully utilize the processing capacity of the transmit processor hardware signal paths. The preferred embodiment also supports additional processing modes not shown in Table I, and which do not fully utilize the processing capacity of the system. Furthermore, while modes 5 and 6 are included in Table I for completeness of the description, they are not important for an understanding of the invention and are therefore excluded from the remainder of the discussion below.

b. Coarse Time Delay

Figure 3:
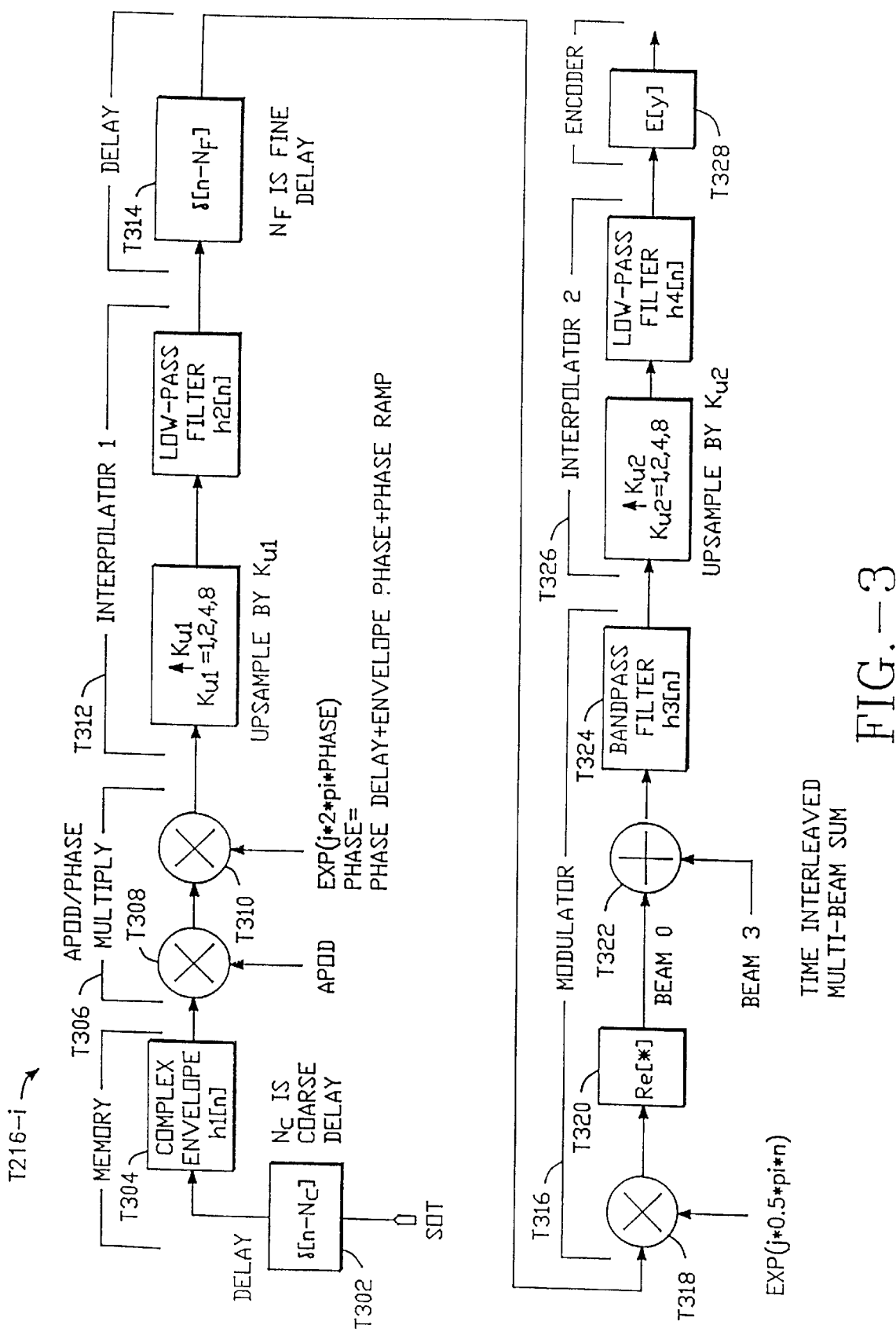
FIG. 3 is a functional block diagram of the signal path of one of the digital multichannel transmitters of FIG. 2C.

FIG. 3 is a functional block diagram of one of the digital multichannel transmit processors T104. In this signal path, upsampling is accomplished in two sub-steps (interpolator 1 and interpolator 2). Modulation to the transmit carrier frequency $F_c$ is also accomplished in two sub-steps, and focusing is accomplished in three steps. The focusing function permits the waveform output produced by the transmitter for each beam to be delayed as necessary for beamforming, in accordance with a delay profile across all active processors. An overall delay word is provided for each beam by the central control system C104 with a high precision and is expressed in integer and fractional sample units of $T_0=1/F_0$. The division of this value into three components in the preferred embodiment of the transmit processor T104 involves roughly a separation of the delay word into three precision groupings. The high-order portion, down to a precision of one unit of envelope sampling time $T_E=1/R_E$, forms the coarse delay integer value $N_C$. The middle-order portion of the word, down to a precision of four units per nominal center-frequency period $T_0=1/F_0$, forms the fine delay integer value $N_F$. The remaining low-order bits of the delay word are used to calculate the phase portion $\phi_D$ of the delay, according to the formula $\phi_D=-2\pi v_\phi \tau_\phi$, where $\tau_\phi$ is the low-order portion of the delay word representing fractional units of $T_0$, and $v_\phi$ is the vernier frequency scaling factor $F_c/F_0$. Note that the transmit processor T104 can also be programmed by the central control system C104 to use an alternate value for $v_\phi$ if desired.

Referring to FIG. 3, the SOT (start-of-transmit; common for all transmit processors) signal triggers a coarse delay T302, which delays the start of read-out of initial waveform samples by $N_C$ sample times at the sampling rate $R_E$ (period $T_E$). Thus the delay imposed by delay unit T302 is $N_C T_E$ relative to the SOT signal.

c. Initial Waveform Sample Memory

As can be seen in FIG. 3, the output of delay unit T302 drives the read-out from memory T304 of initial waveform samples. The output of initial waveform sample memory T304 functionally is provided to one input port of a multiplexer T305, the other input port of which receives a value of unity. For PW firings, the multiplexer selects the memory sample words to its output, whereas for generating a CW output, the multiplexer selects the constant unity input.

Waveform samples in memory T304 may be real instead of complex, saving memory space because a complex value occupies two words, whereas a real value occupies one word. Preferably, the initial waveform is at baseband (at or near 0 Hz), in which case it represents the complex envelope of the transmitter output pulse. The only limitation on number of initial waveform samples is the total number of words available for storage in memory T304. Other than that, any number of separate initial waveforms can be downloaded into the memory T304, beginning at any address. Prior to a firing, the central control system C104 can download the start address, number of samples, and actual sample values for each beam in each processor, so a wide variety of different options are available for waveform generation with each firing.

For example, a single initial waveform can entirely fill the memory T304, or multiple waveforms can fill different parts of memory T304. As another example, the central control system C104 can download two different waveforms, and by programming alternate start addresses on alternate firings, can generate differently shaped transmit pulse waveform outputs on alternate firings. This last example might be useful, for example, to interleave firings for two alternating imaging modes. Specifying different initial waveforms per beam permits depth- and angle-dependent pulse shaping, whereas specifying different initial waveforms for different imaging modes permits implementation of different mode-dependent compromises for such trade-offs as spatial resolution versus signal-to-noise ratio (SNR).

The ability to program initial waveforms digitally not only permits the generation of pulses having a waveform approximating one that does not distort during transmission through attenuative media such as the body (e.g., a Gaussian shape), it also permits a waveform to be programmed which improves axial resolution by compensating for the undesired characteristics of transducer impulse response such as bi-modal response and long ring-down response. The choice of initial waveform samples can also pre-compensate for (1) distortions in the analog transmit and receive paths, (2) distortions in the digital filter responses in the transmit and receive beamformers, and (3) some distortions in the propagation path of the ultrasound signal. This latter compensation can reduce the effect of frequency-dependent attenuation on either the SNR or the lateral resolution. These are all significant advantages over the capabilities of prior art ultrasonic transmit beamformers.

If the initial waveform samples provided in memory T304 are complex, then in some embodiments it might be provided in in-phase/quadrature form, whereas in other embodiments it might be provided in magnitude/phase form. In the implementation of the preferred embodiment described herein (see FIG. 4), it will be seen that the information is provided in magnitude/phase form.

d. Apodization/Phasing

The initial waveform sample output of memory T304 is connected to an apodization/phase multiply unit T306, which multiplies the magnitude of each sample by an apodization value in multiplier T308, and then, in multiplier T310, rotates the phase of each sample to a phase $\phi$ given by the sum of the waveform sample phase $\phi_E$, the phase portion $\phi_D$ of the delay, and a vernier phase ramp value $\phi_R$ derived from the vernier factor $v=F_c/F_0$. $\phi_D$ is a constant during waveform generation and is calculated once during a pre-waveform-generation setup. The phase $\phi_E$ and the sample phase ramp $\phi_R$, however, change for each initial waveform sample. Thus, the sum $\phi=\phi_D+\phi_E+\phi_R$ is calculated for each initial waveform sample.

Alternatively, the low-order portion of the delay could be accomplished by an interpolation of waveform samples to create signal samples at equivalent time delay in the signal path. See section 6.3.2 of the text by Dudgeon and Mersereau for a general discussion of interpolation beamforming. In this case, $\phi=\phi_E+\phi_R$ only.

In another embodiment, the low-order portion of the delay, or even the entire delay, could he 15accomplished using a focusing filter, as described for filter-and-sum beamforming in section, 6.2.5 of the previously cited text by Dudgeon and Mersereau. Such a filter is programmed differently for each digital multichannel transmit processor, and each waveform associated with each beam within a transmit processor, to account for the desired signal delay versus frequency characteristic needed to support transmit beamformation. The filter will therefore generally have a nonlinear phase response. The focusing filter characteristics therefore contrast with the signal path filters associated with the interpolation and modulation operations shown in FIG. 3, which preferably have linear-phase responses (therefore yielding no distortion of signals passing through a filter) and which are typically set to identical characteristics in all transmit processors. The interpolation and modulation operation filters are used for waveform shaping, not beamforming, and the same waveform (with appropriate delay and apodization) is normally created in all transmit processors, although the invention supports selection of different filters among transmit processors.

$\phi_R$ is calculated as follows. As previously mentioned, the signal path of FIG. 3 modulates the initial waveform samples by the desired carrier frequency $F_c$ in two operations. For a programmed $F_c$, the central control system C104 (FIG. 1A) selects from a plurality of transmit signal nominal center frequencies $F_0$ (which sets the digital processing rate)

close to $F_c$ and calculates a vernier factor $v=F_c/F_0$. As suggested in Table I, the available values for $F_0$ each represent one of a plurality of available fractions of the DAC sampling frequency $F_S$, which the central control system C104 also selects from one of a plurality of available clock frequencies. Thus in selecting an $F_0$, the central control system C104 determines which sampling frequency $F_S$ to use and which fraction of $F_S$ should determine $F_0$.

The central control system C104 does not explicitly download $F_0$ to each transmit processor T104; rather, it controls the frequency generator T256 to generate $F_S$, and downloads a value for the interpolator 2 integer upsampling factor $K_{u2}$. That information implicitly specifies $F_0$ according to the relationship $F_0=F_S/4K_{u2}$. It should be noted, however, that the information required by each transmit processor T104 is $K_{u2}$, not $F_0$. The transmit processor T104 does not explicitly need to know $F_0$, but only information relative to the clock frequencies.

In order to account for the difference between $F_0$ and $F_c$, the central control system C104 downloads v to each transmit processor T104. Each transmit processor then computes the phase ramp term $\phi_R$ according to the formula:

$$\phi_R=2\pi K_{u1}(v-1)n/4,$$

where n is the initial waveform sample number. Each transmit processor T104 calculates $K_{u1}$ (the upsampling factor for interpolator 1) from $K_{u1}=4N_B/K_{u2}$ based on the number of beams $N_B$ and interpolation factor $K_{u2}$, which was downloaded from the central control system C104.

Theoretically v can range from 0 (inclusive) to 2 (exclusive) (a range which can be expressed using the shorthand notation "[0,2)"). As a practical matter, however, the filter response characteristics of the filters h2, h3 and h4 in the transmit processor signal path limit the usable range for v to some smaller range within [0,2).

The frequency vernier factor v can be specified independently for different beams being produced by the transmit beamformer system T102, for example to reduce sear interference or to increase penetration of deeper focusing beams. Independent values of v could also be specified for mixed imaging modes, in order to achieve the desired imaging-mode-dependent compromises between resolution and sensitivity (which determines penetration depth). The central control system C104 also has the ability to download independently-selected v for each of the plurality of transmitters T103 (i.e., for different transducer elements T114 in the array T112), and can download values for v in advance of each firing if desired.

e. Interpolator 1

The output of apodization/phase multiplier T306 is provided to a first interpolator T312 which upsamples the sampled waveform information by the factor $K_{u1}$ and low-pass filters it using a filter h2. The factor $K_{u1}$ depends on the processing mode in which the transmit processor T104 is operating. Specifically, $K_{u1}$ takes on whichever value is necessary to bring the sample rate on the output of interpolator T312 to four samples per period of the transmit signal nominal center frequency $F_0$. In general, therefore, $K_{u1}=4F_0/R_E$. $K_{u1}$ is not downloaded to the transmit processor, but is derived by the transmit processor calculation $K_{u1}=4N_B/K_{u2}$ as mentioned above.

Filter h2 is used to low-pass filter the upsampled output of the $K_{u1}$ up-sampler in order to remove replicated images of the original signal at higher frequencies. As used herein, the operations performed by an "interpolator" (or "upsampler") and "decimator" (or "downsampler") are reciprocal operations, and either can take place with a factor either larger or smaller than unity. Thus, for example, upsampling by a factor of ½ is the same as decimating by a factor of 2. Also as used herein, a digital signal processing interpolator, or simply "interpolator," performs both upsampling and filtering, as described in sections 2.3.3 and 2.4 of the previously cited text by Crochiere and Rabiner. The filter transfer function in an interpolator can be unity, in which case the interpolator is the same as an upsampler alone.

f. Fine-Time Delay Memory

The output of the first interpolator T312 is provided to a second delay unit T314 which delays each sample by $N_F(T_0/4)$ ($N_F$ is an integer). As set forth above, $N_F$ is the fine delay portion of the overall desired time delay. Thus, a coarse delay of $N_C T_E$ is applied in delay unit T302 to a resolution of one sample interval at the initial waveform sampling rate, and a fine delay $N_F(T_0/4)$ is applied by delay unit T314 to a resolution of ¼ period of the transmit signal nominal center frequency $F_0$ for bandwidth modes 0 through 4, and ¾ period for bandwidth modes 5 and 6. If the initial waveform sample rate is equal to four samples per cycle of $F_0$ (i.e. if $R_E=4F_0$), then delay unit T314 would introduce no additional time delay. The phase portion $\phi_D$ of the overall desired time delay (applied in the apodization/phase multiply unit) is a phase rotation at the nominal center frequency equivalent to the fractional portion of the desired time delay that is less than ($T_0/4$).

g. Modulator

The output of delay unit T314 is provided to a modulator T316. In multiplier T318 of the modulator T316, modulation of the initial waveform by $F_0$ is accomplished by multiplying by $\exp(jn\pi/2)$, in which n corresponds to the sample index. This embodiment's choice of an intermediate sample rate (after the first interpolator) of four samples per cycle of $F_0$ is advantageous because $\exp(jn\pi/2)$ then takes on only the values (−1, 0, 1). Multiplier T318 thus can be implemented very simply in hardware by appropriate add and subtract operations. In a different embodiment, the intermediate sample rate could be made equal to two samples per cycle of $F_0$.

In functional block T320 of the modulator T316, the transmit processor takes the real part of the modulated signal output of the multiplier T318. In hardware implementation, blocks T318 and T320 can be combined by having the multiplier T318 simply not generate any of the in-phase or quadrature samples which would be discarded by block T320.

The signal path in FIG. 3 from the SOT signal through block T320 is conceptually paralleled for each beam being produced by the transducer array, effectively providing separate channels. (In implementation, the different beams are interleaved through a common set of hardware.) In summer T322 of the modulator T316, all the beams are de-interleaved and superposed together. The result is band-pass filtered through a filter h3, annotated as block T324 of the modulator T316. Filter h3 is a band-pass filter used to attenuate energy at 0 Hz and at image frequencies that were not sufficiently reduced by filter h2.

h. Interpolator 2

The output of modulator T316 is then upsampled by a second interpolator T326 to the DAC input sample frequency $F_S$. Interpolation is accomplished by upsampling the signal by the factor $K_{u2}$ and low-pass filtering the result through a filter h4. In general, $K_{u2}=F_S/4F_0=F_S/K_{u1}R_E$. Filter h4 is used to filter out unwanted images after the signal has been upsampled to the DAC sample frequency. The design of interpolation filters and interpolators is well known in the art (as described in the above-cited *Multirate Digital Signal*

*Processing* by Crochiere and Rabiner) and need not be further described herein.

i. DAC Encoder

The output of interpolator T326 is encoded by encoder T328 to the form required for DAC T121 (FIG. 1B) and provided thereto. The encoder T328 also hard limits the filtered data into the available DAC range.

Note that the signal path of FIG. 3 forms a pineline in which downstream units may be processing earlier samples of the waveform at the same time that upstream units are processing later samples of the waveform. Even though such operations run in parallel and overlap in processing time, the upstream units are still referred to herein as performing their functions "before" the downstream units. Also, while the pipelining of functions is preferred, it will be understood that in another embodiment, a digital transmit beamformer can be implemented sequentially in which each step is performed in its entirety for the entire pulse waveform before the next step is performed. Intermediate embodiments are possible as well.

2. Hardware Implementation of Signal Processing Path

As previously mentioned, several of the functions of various ones of the functional units illustrated in FIG. 3 can be combined on implementation to reduce the amount of hardware required to accomplish the joint functions. Also, in some situations, the conceptual function depicted in FIG. 3 reduces to a simple degenerate case that can be implemented using little or no hardware at all. Before describing the local control processors for the signal path of FIG. 3, it will be useful to understand some aspects of the hardware implementation of the signal path.

FIG. 4 is a block diagram of a preferred implementation of apparatus T400 which implements two digital multichannel transmit processors of the transmit beamformer system T102. The pairing of processors permits advantageous sharing of certain hardware as will be seen below. A portion of the transmitter pair in FIG. 4 is fabricated on a single chip.

Referring to FIG. 4, the initial waveform sample memory T410 contains the initial waveform information for all beams in both transmit processors. The sample values are written to initial waveform sample memory T410 by an I/O processor T402 (described below) in response to the downloading of the samples by central control system C104. The memory T410 is organized as a plurality of double-words or as twice as many single-words, and as viewed by the central control system, is memory-mapped in the same address space as the parameter registers in the I/O processor T402, also described below. The memory can contain any combination of real and/or complex waveforms of varying lengths as long as the total length occupied by the waveforms stored is less than or equal to the total memory space available.

Individual initial waveform samples are read out of memory T410 at the initial waveform sample rate $R_E$, which is the same for every beam of both transmit processors and is dependent on $F_0$ and $N_B$. Since multi-beam waveform samples are read from the memory T410 in a time-interleaved manner, all processing modes shown in Table I maximize hardware usage by using the maximum memory data rate of $R_D=2R_E N_B$ samples per unit time.

While the phase portion of each complex sample read from memory T410 is provided to the $\phi_E$ input of phase and frequency processor T418 as described below, the magnitude portion $M_E$ is provided to apodization and phase multiplier T420. Apodization and phase multiplier T420 also receives pre-computed apodization values from I/O processor T402 (interleaved by transmit processor and beam number) and phase outputs $\phi$ of phase and frequency processor T418 in in-phase/quadrature (I/Q) format (interleaved by transmit processor and beam number). Functionally, apodization and phase multiplier T420 converts each sample value from magnitude/phase format $M_E\exp(j\phi_E)$ to I/Q format $M_E\cos(\phi_E)+jM_E\sin(\phi_E)$ at the same time that it multiplies the magnitude $M_E$ by the apodization value and adds to the phase to account for the delays and phase ramp. The output of apodization and phase multiplier T420 is produced at a rate of $4R_E N_B$ values per unit time, with values interleaved by I and Q values, by transmit processor and by beam number. These values are separated at this point into two parallel sequences, the values for transmit processor 0 being used by the transmit processor 0 path and the values for transmit processor 1 being used by the transmit processor 1 path. The individual transmit processor outputs are therefore each provided at a rate of $2R_E N_B$, in a form which is interleaved by beam number and I/Q values. At this point, only the functional blocks for the remainder of transmit processor 0 will be described since the functional blocks for the remainder of transmit processor 1 are identical.

The output of apodization and phase-multiplier T420 for transmit processor 0 is provided to a block T422 which performs the functions of both the first interpolator T312 and the fine delay unit T314 (FIG. 3), including low-pass filter h2. Specifically, it performs upsampling by $K_{u1}$, fine delay by $N_F$, and filtering by h2, and a portion of the Re{ } (real part) function, all together. Upsampling by $K_{u1}$, which theoretically requires the insertion of $(K_{u1}-1)$ zeros between samples of each waveform of each beam, is accomplished simply by observing the contents of internal pipeline registers at a rate of $K_{u1}$ times the rate at which they are being loaded.

Note that the processing block T422 does not need to generate both an in-phase (I) and quadrature (Q) component for each output sample. Due to the choice of modulation frequency described hereinafter and the sufficiency of computing only the in-phase values required by the Re{ } function, it will be appreciated by those skilled in the art that, depending on the output sample, only an I or a Q component needs alternately to be generated for each output sample.

The output of block T422 carries $K_{u1}R_E N_B=4F_0 N_B$ samples per unit time, interleaved by beam number. Again, the processing modes of transmit processors T104 permit a trade-off at this point between the transmit signal nominal center frequency $F_0$ and the number of beams $N_B$.

Processing block T424 performs all of the functions of modulator T316 (FIG. 3). Modulation by $F_0$, as well as the Re{ } function, are accomplished entirely by a selective negation operation (not shown) in the signal path. This is possible because the modulation frequency was fixed at four times the sample rate at this point.

The output of the processing block T424 is interleaved by beam. It still has a data rate of $4F_0 N_B$ samples per unit time, which by now are all real values. The processing block T424 then sums the interleaved values for the different beams to produce a composite sample for the transmit processor. All $N_B$ waveforms being produced by the transmit processor are at this point superposed. Processing block T424 then performs filtering by h3 on the composite sample stream in a conventional manner.

The output of processing block T424, which occurs at a real-valued sample rate of $4F_0$, is provided to she second interpolator block T426. As with the upsampler in processing block T422, the interpolator T426 upsamples the input sample rate to $4K_{u2}F_0=F_S$ simply by creating the output values at a rate of $F_S$ from the input values which were clocked into pipeline registers (not shown) in the block T426 at the input sample rate $4F_0$. The signal is then filtered by h4.

The output of the second interpolator T426 is connected to the input of an encoder/DAC block T428 and provided at the full DAC sampling frequency of $F_S$. The encoder/DAC T426 is described in more detail below.

3. Local Control Processors

The apparatus of FIG. 4 also includes an I/O processor T402, which handles the reads and writes to all programmable resources in the apparatus. In addition, the I/O processor calculates some parameters during a pre-compute operation prior to each transmit firing. All downloading of parameters to the apparatus T400 occurs from the central control system C127 through an address/data multiplexed bus T406 to memory-mapped parameter registers located functionally within the I/O processor T402. Some of the registers are programmable by the central control system C104 per beam and per transmit processor, whereas others are programmable only for the transmit processor pair. Still other parameter registers in I/O processor T402 (such as $K_{u1}$, $N_C$, $N_F$ and $\phi_D$) have their contents pre-computed by the I/O processor T402 prior to each firing.

The two processors in the processor pair T400 also share a common memory address and delay processor T416 and a common phase and frequency processor T418. The memory address and delay processor T416 receives the SOT signal, as well as the initial waveform sample start addresses (per beam and per transmit processor), the waveform length information (per beam and per transmit processor) and the coarse delays $N_C$ (per beam and per transmit processor) from the I/O processor T402. It provides addresses on a sample memory address bus T414 in order to read out initial waveform samples in a manner which is interleaved by transmit processor, by beam and by magnitude/phase values.

The phase and frequency processor T418 receives the SOT signal from central control system C104, as well as the input sample phases $\phi_E$ arriving from sample memory T410. From I/O processor T402, it receives the frequency vernier factors v (per beam and per transmit processor), the phase portion $\phi_D$ of the delay values (per beam and per transmit processor), and $K_{u1}$ (constant for all beams in both transmit processors). The input sample phase values arrive from waveform sample memory T410 at a rate of $2R_F N_B$, interleaved by transmit processor and beam. The phase and frequency processor T418 multiplexes the v factors in a manner which matches the interleaved arrangement of $\phi_E$'s, and multiplexes the $\phi_D$'S in the same manner.

The control processors T402, T416 and T418 will now be described in more detail. Control logic block C125 represents the timing and control logic which operates the various low-level signal path components in the hardware embodiment of FIG. 4. This logic is conventional and need not be described.

a. I/O Processor

Figure 5:
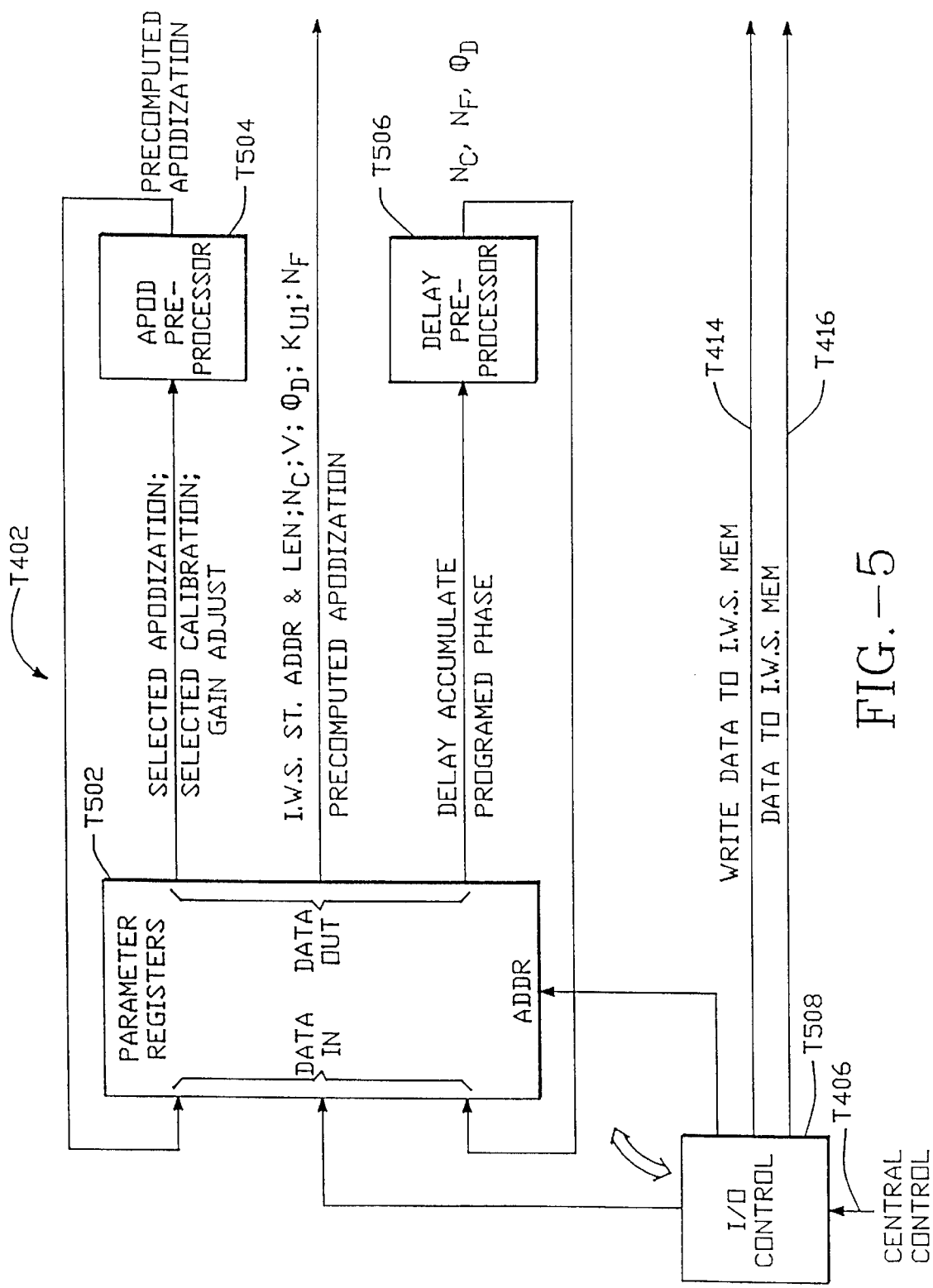
FIG. 5 is a functional block diagram of the I/O processor of FIG. 4.

FIG. 5 is a functional block diagram of I/O processor T402 (FIG. 4). It comprises a parameter register bank T502, an apodization preprocessor T504, a delay preprocessor T506 and an I/O control unit T508. All of the parameter registers T502 and all of the waveform sample memory T410 locations in all transmitters are memory-mapped in the same address space as seen by central control system C104 (FIG. 4). The central control system C104 communicates with the transmit processors (as well as with other components in the beamformer system R22) via a pair of system buses, and interface logic (not shown) combines downloaded information from both system buses onto the address/data bus T406 for individual transmit processor pairs.

The procedures for downloading parameters employ a number of techniques which minimize the overhead time required, thereby minimizing the time required to update the parameters between firings and maximizing the frame rate. For example, central control system C104 can operate in a broadcast mode in which the same information is written to all the transmit processor pairs T400. The broadcast mode is useful, for example, for downloading initial waveform samples to all transmit processors in cases where the data is to be the same for all such transmit processors. As another example, central control system C104 can write the same data simultaneously to registers associated with all beams of one or both transmit processors in a transmit processor pair. The transmit processor pair T400 also includes a register address auto-increment feature in which central control system C104 can write to sequential addresses without having to specify a new address for each write. The addresses for the parameter registers are chosen to take advantage of this feature. Parameter information can be downloaded to the transmit processors only between firings.

The parameters downloaded by central control system C104 to the I/O processor include the initial waveform samples (separately per beam and per transmit processor); initial waveform sample start address, length and type (real or complex) (one set per beam per transmit processor); interpolation factor $K_{u2}$ and number of beams $N_B$ (one set per transmit processor pair); filter programming for filters h2, h3 and h4 (one programming per filter per transmit processor pair); the frequency vernier factor v and an alternate frequency vernier factor $v_a$, together with a selection of which to use for calculation of the phase ramp term $\phi_R$ (one set per beam per transmit processor); a common delay offset term (one value per transmit processor pair); a delay value and an arbitrary additional programmed phase value (one set per beam per transmit processor); an apodization value (one value per beam per transmit processor); delay calibration values (eight values per beam per transmit processor); apodization calibration values (eight values per beam per transmit processor); a selection of which delay and apodization calibration values to use (one selection per transmit processor); overall transmit processor gain management values; and a selection of either PW or CW signal operation (one selection per transmit processor pair). Calibration is described below.

Note that each of the per-beam delay values has two register addresses: one for initializing a "delay accumulate register" with the downloaded value, and one for accumulating the downloaded value with the prior contents of the parameter register. As set forth more fully in the above-cited METHOD AND APPARATUS FOR FOCUS CONTROL OF TRANSMIT AND RECEIVE BEAMFORMER SYSTEMS co-pending patent application, the central control system translates a desired focal range and steering angle into a delay profile by using delay offsets which are predefined on a sparse grid of ranges and steering angles. The grid is predefined only for beams originating from the center of the transducer array, so the central control system performs computations to shift the grid to the desired beam origin, interpolating between transmit elements as necessary. The central control system also interpolates between steering angles on the sparse grid if the desired steering angle falls between grid angles. Interpolation is performed also in range if the desired focal range falls between ranges on the grid, but the computations of this interpolation are shared partially by the central control system and partially by each transmit processor. Specifically, the central control system scales the two nearest (in range) delay profiles by the appropriate interpolation coefficients, sums them by transmitting them to the delay accumulate registers in the parameter register bank T502.

Initial waveform samples being downloaded are received by the I/O processor T402 in the same manner as it receives parameter information. The I/O control unit T508 determines a local sample memory address from the address specified by the central control system C104, and provides that address on sample memory address bus T414. it drives the sample data onto sample memory data bus T416.

Each pulse firing by transmitter pair T400 is preceded by a pre-computation period. During the pre-computation period, the apodization pre-processor T504 is provided with the selected apodization values for the individual waveforms to be produced, the selected apodization calibration values for such waveforms, and a gain adjust value (one of the downloaded gain management values). The apodization pre-processor T504 multiplies these together in a conventional manner to produce "pre-computed apodization" values for each waveform to be generated by each transmit processor. These values are written into respective additional ones of the parameter registers T502.

Also during the pre-computation period, I/O processor T402 computes $K_{u1}$ from $K_{u1} = 4N_B/K_{u2}$ by means not shown in FIG. 5.

Also during the pre-computation period, delay pre-processor T506 computes the three delay components $N_C$, $N_F$ and $\phi_D$, one set per beam per transmit processor. It does so by taking into account the accumulated delay value in the delay accumulate register, the programmed phase value, and the individual per-transmit processor, per-beam pipeline and filter delays of the signal path. Ignoring the signal path delays for simplicity, the delay pre-processor calculates the delay portions $N_C$, $N_F$ and $\phi_D$ by division into high-order, mid-order and low-order bit words, as previously discussed.

Thus all of the parameter registers T502 which are needed to generate $N_B$ properly shaped, delayed, apodized and modulated waveforms in each transmit processor have been downloaded or pre-computed before waveform generation begins.

b. Memory Address and Delay Processor

FIG. 6 functionally illustrates the computations made by memory address and delay processor T416. As shown in the diagram, the address processor T416 performs the following functions. At the SOT signal, a counter T602 begins counting in units of $T_E = 1/R_E$. Both transmit processors have the same number of beams and upsampling rates, and therefore share the same count. Call the current count N. The $N_C$ term for all beams and both transmit processors are then selected in interleaved fashion. A complete cycle of beams and processors is made for each N (i.e., for each period of $R_E$). The $N_C$'s are divided by $2K_{u1}$ (divider T606) and subtracted (T608) from the count in a time-multiplexed fashion. Call this sum B, given by $B = N - N_C/2K_{u1}$. B is compared with zero (comparator T610) and with the initial waveform length L to determine if memory should be read. A sample is not read if B<0 or B≧L. If reading out of memory, the memory address is given by A=B+S, where S is the start address of the initial waveform. This sum is performed by summer T616.

Each address of the envelope memory T410 corresponds to a double-word. In normal operation, the most significant bits (MSBs) represent amplitude and the least significant bits (LSBs) represent phase. Initial waveform samples may also be stored as real samples only, in which case the MSBs represent one real sample and the LSBs represent the next real sample. The memory is thus accessed at a rate of $R_E$ samples (real or complex samples) per unit time for each beam of each transmit processor, which is a total data rate of $R_D = 2 \cdot N_B \cdot R_E$ samples per unit time.

The memory read enable (T610) could be used directly as the source of initial waveform samples instead of the memory output if the flexibility of programmed waveform samples is not desired. Also, other more complicated real-time computational schemes could be used to provide the initial waveform samples instead of the memory. However, the use of a memory for the source of waveform samples is preferred.

Note that the calculation of address A does not take into account the sign bit of B. This is acceptable since samples will not be read out of memory when B is negative. Also note that the sum may overflow. An initial waveform representation may therefore wrap around the waveform memory.

c. Phase and Frequency Processor

FIG. 7 functionally illustrates the calculations performed by phase and frequency processor T418 on one beam of one transmit processor. In implementation, the hardware can be multiplexed in the same manner as the interleaving of $\phi_E$'s, similarly to FIG. 6. Phase and frequency processor T418 includes a block T702, which calculates the per-sample phase ramp increment from $\phi_R/n = K_{u1}(v-1)/4$ and provides the result to an accumulator T704. The accumulator T704 adds to itself the output of block T702 once every $R_E$ clock cycle, which corresponds to once for each initial waveform information sample for the beam and transmit processor. The output of accumulator T704 is $\phi_R$, and is provided to one input of a 4-port adder T706. The other three ports of adder T706 receive $\phi_E$, $\phi_D$ and the programmed transmit processor phase. The sum output of adder T706 is $\phi$, which is then provided to a sine/cosine table T710. The sine/cosine table T710 is operated alternately as a sine table and as a cosine table. The output of sine/cosine table T710 is the quadrature portion $\sin(\phi)$ of $\exp(j\phi)$ interleaved with the in-phase portion $\cos(\phi)$ of $\exp(j\phi)$. Because of the multiplexing of the hardware in phase processor T418, $\sin(\phi)$ and $\cos(\phi)$ are provided interleaved with each other at a data rate of $2R_E N_B$ full $\phi$'s per unit time. Overall, the $\phi$'s are interleaved by $\sin(\phi)$ and $\cos(\phi)$, by transmit processor number and by beam number.

4. Output Signal Path a. Encoder/DAC

Returning to FIG. 4, the output of processing block T426 in each transmit processor is provided to an encoder/DAC T428. The encoder/DAC T428 is illustrated functionally in FIG. 8. As shown in FIG. 8, the binary input sample values are provided to an encoder T802 which encodes it into the form of six thermometer-code (equally weighted) MSBs, three binary LSBs, and a sign bit. The encoder T802 also performs either ratiometric compression or hard limiting of the input sample value in order to narrow the dynamic range to that of the encoded output scheme.

The coded output of encoder T802 is provided to a pair of current-output DACs T804 and T806, one for positive values and one for negative values. The sign output of encoder T802 is used to enable only the appropriate DAC. Although not depicted by FIG. 8, the encoder and the DAC bit switches are all located on the same integrated circuit (IC) as the remainder of the circuitry shown in FIG. 4, the resistors driven by the DAC switches and other active circuits used to implement DACs T804 and T806 are all located separately. The choice of six thermometer-coded bits is made in order to limit the current through any one DAC switch, whereas the choice of only three binary-coded bits is made to minimize the pin count of the IC where the current drive requirements are not great. The current from each of the resistors turned on by the DAC switches are summed to form the output current of the DAC. A voltage reference is used to set the current across the DAC resistors and can be adjusted to control the gain of the DAC.

The mixed use of thermometer-coded DAC bits and binary-weighted DAC bits to construct a DAC, the adjustment of voltage references to set the level of DAC output, and the summation of resistor currents selected by DAC switches to form DAC output current are individually well known in the art, but the manner described herein for use in an ultrasonic digital transmit beamformer is not.

The output signal path could consist entirely of a DAC connected directly to a transducer element, but this would not be the preferred implementation.

b. Output Amplifier

The differential current outputs provided by DACs T804 and T806 are provided to a respective pair of current amplifiers T808 and T810, to reduce the current output requirements on the DACs. The amplifier outputs are provided to a pair of high voltage output stages T812 and T814 that drive the differential inputs of one of the windings of a transformer T816. The center tap T818 of that winding is tied to the high voltage programmable power supply. The high voltage level can be adjusted to control power drawn from the high voltage power supply. The output signal is taken single-ended from the other side of the transformer. The transformer is followed by an output filter T820 to reduce the aliasing products generated by the DACs. The signal is then sent to the transmit demultiplexers.

Although the design of current amplifiers, the use of high voltage output stages to differentially drive transformers, and the use and design of transformers and output filters are individually conventional, they have not heretofore been combined in the manner described herein in an ultrasonic digital transmit beamformer.

Note that other less preferred implementations are possible to perform the Encoder/DAC/Current Amplifier functions, such as a single-ended DAC driving a single-ended amplifier (possibly requiring no encoder), or other DAC implementations (e.g. thermometer plus R-2R, binary plus R-2R, and so on). Alternative DAC implementation techniques are described in Analog Devices, "Analog-Digital Conversion Handbook," 3d ed. (1986), incorporated herein by reference in its entirety. By combining these functions in the manner described herein, a highly programmable digital multi-channel transmitter is achieved.

5. Calibration

The transmit multiplexer T106 (FIG. 1A) permits connection of transmitters to different transducers. As previously mentioned, parameter registers T502 (FIG. 5) include registers to store apodization calibration values and registers to store phase calibration values. Thus calibration values can be stored to compensate for variations in gain and delay for several analog transmit path conditions. This is advantageous because the active aperture may move across the face of the transducer array during a scan, requiring different element connections. Different firings in a scan also may utilize different transmit frequencies, which could also affect the calibration values. By pre-calibrating the transmitters for each of the possible connections and/or frequencies which will be used in a particular scan, only a calibration register select need be sent by central control system C104 to the transmitters in advance of each firing in the scan.

In order to calibrate the transmitters, the central control system C104 operates the transmit demultiplexers T106 to couple electrically the transmitters to a calibration receiver. A first connection is first selected, and a single transmitter is fired. The output of the calibration receiver is sent back to the central control system C104, which uses the information to write the appropriate phase and apodization corrections into the phase and apodization calibration registers for the selected transmitter and connection selection. The process is repeated for each connection arrangement in each of the transmitters, and if desired, for each transmit frequency which will be used in the scan.

During the scan, the central control system C104 can specify selection of a calibration register using either a group configuration mode or an individual configuration mode. In the group configuration mode, all transmitters compute their own configuration register select value. The central control system C104 broadcasts a parameter to all of the transmitters specifying the position of the aperture across the transducer array for the next firing. Each transmitter uses this value, together with its own position in the overall transducer array to independently calculate its own calibration register select value.

In the individual configuration mode, the central control system C104 determines a calibration register select for each of the transmitters and downloads the select values to parameter registers in each of the transmit processors.

The transmitters support a per-transducer element frequency response calibration. Each element in a transducer array has its frequency response measured (and/or has the frequency response of its analog signal path measured), which is processed to generate and store a correction inverse impulse response. The central control convolves (combines) this correction impulse response with the desired transmitter initial waveform and downloads the corrected initial waveform into the initial waveform sample memories for each of the transmitters. Alternately, the correction response and the desired response can be convolved (combined) with off-line means, in which case the central control only has to download the corrected initial waveform.

Additional information on the calibration process can be found in the above-cited METHOD AND APPARATUS FOR FOCUS CONTROL OF TRANSMIT AND RECEIVE BEAMFORMER SYSTEMS and METHOD AND APPARATUS FOR RECEIVE BEAMFORMER SYSTEM co-pending patent applications.

The foregoing description of embodiments of the present invention has been provided for the purposes of illustration and description. It is not intended to be exhaustive or to limit the invention to the precise forms disclosed. Many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. A method for transmitting ultrasonic waveforms from medical ultrasound imaging system, the method comprising the steps of:

(a) superposing first and second waveforms corresponding to first and second beams, respectively;

(b) applying the superposed first and second waveforms to a transducer;

(c) transmitting in response to step (b) at least the first and second beams substantially simultaneously along first and second scan lines, the first and second beams associated with a substantially same transmit center frequency;

(d) receiving echo signals responsive to the transmission of step (c); and (e) generating a medical diagnostic image on a display, the image responsive to the echo signals.

2. The method of claim 1 further comprising the step of (f) repeating the steps (a), (b) and (c).

3. The method of claim 1 further comprising the steps of:

(d) transmitting at least a third beam along a third scan line substantially simultaneously with step (c).

4. The method of claim 1 wherein the step (c) comprises generating first and second electrical signals for each transducer element in first and second pluralities of transducer elements, respectively.

5. The method of claim 4 wherein the first plurality comprises the same transducer elements as the second plurality.

6. The method of claim 5 wherein the step (c) comprises applying a different delay function across the transducer elements for the first and second electrical signals.

7. The method of claim 1 wherein the step (c) comprises transmitting $N_B$ beams associated with a transmit signal nominal center frequency $F_0$.

8. The method of claim 4 wherein the step (b) comprises:

providing to a signal path associated with each transducer element initial waveform samples; and applying to an ultrasonic transducer comprising the transducer elements output waveforms responsive to said initial waveform samples, said method further comprising, prior to said step of applying, at least one of:

the step of modulating by a desired frequency samples in said signal path, the step of upsampling samples in said signal path, the step of interpolating samples in said signal path, the step of time delaying by a time delay samples in said signal path, the step of focus filtering with a filter samples in said signal path, and the step of phase rotating by a phase samples in said signal path.

9. A medical ultrasound imaging apparatus for transmitting ultrasonic waveforms and imaging in response to the waveforms, the apparatus comprising:

first and second sources of first and second initial waveform samples, respectively, for an output waveform;

a transducer comprising a plurality of transducer elements; and a plurality of signal paths coupled between each of said first and second sources and the plurality of transducer elements;

wherein the transducer and signal paths are operative to transmit along first and second scan lines substantially simultaneous first and second beams corresponding to the output waveform, the first and second beams associated with a substantially same transmit center frequency;

a receive beamformer for receiving echo signals in response to a transmission; and a display for generating a medical diagnostic image responsive to the echo signals.

10. The apparatus of claim 9 wherein at least a first signal path of said plurality of signal paths including at least one of the following elements: an upsampler, an interpolator, a modulator, a time delay element, and a phase rotation element.

11. The apparatus of claim 9 wherein at least one of the plurality of signal paths comprises:

said first source of initial waveform samples a digital signal processing path;

a DAC coupled to said digital signal processing path; and an output signal path coupled to said DAC.

12. Apparatus according to claim 11, wherein said first source of initial waveform samples comprises one of the group consisting of (I)(a) a memory containing said first initial waveform samples, (b) in combination, (1) a memory containing said first initial waveform samples and having data output coupled to said digital signal processing path, said memory further having an address input, and (2) a counter having an output coupled to said address input of said memory, (c) a source of an impulse coupled to a waveshaping filter in said digital signal processing path, and (d) means for computing said first initial waveform samples sequentially and providing the first initial waveform samples sequentially to said digital signal processing path;

and wherein said digital signal processing path includes at least one of the following: (II)(a) an upsampler, (b) an interpolator, (c) a modulator, (d) a time delay element, (e) a phase rotation element, (f) an apodization multiplier, (g) an encoder which provides to said DAC samples from said digital signal path in encoded form, (h) a filter, and (i) means for time delaying samples in said digital signal path by creating interpolated samples which approximate a desired time delay.

* * * * *

UNITED STATES PATENT AND TRADEMARK OFFICE
CERTIFICATE OF CORRECTION

PATENT NO. : 6,104,673
DATED : August 15, 2000
INVENTOR(S) : Christopher R. Cole et al.

It is certified that error appears in the above-identified patent and that said Letters Patent is hereby corrected as shown below:

Column 1,
Line 9, delete "divisional" and substitute -- continuation -- in its place.
Line 10, after "July 15, 1996," insert -- which is a continuation of 08/432,056, filed May 2, 1995, --.

Column 2,
Line 19, delete "998-904" and substitute -- 898-904 -- in its place.

Column 5,
Line 52, delete "?analog" and substitute -- analog -- in its place.

Column 10,
Line 18, delete "R-56" and substitute -- R-66 -- in its place.

Column 20,
Line 41, delete "could he 15accomplished" and substitute -- could be accomplished -- in its place.
Line 43, delete "section, 6.2.5" and substitute -- section 6.2.5 -- in its place.

Column 21,
Line 38, delete "sear" and substitute -- beam -- in its place.

Column 24,
Line 63, delete "she" and substitute -- the -- in its place.

Signed and Sealed this

Twenty-third Day of April, 2002

Attest:

JAMES E. ROGAN
Director of the United States Patent and Trademark Office

Attesting Officer